United States Patent
Gschwind et al.

(10) Patent No.: US 9,311,095 B2
(45) Date of Patent: *Apr. 12, 2016

(54) USING REGISTER LAST USE INFORMATION TO PERFORM DECODE TIME COMPUTER INSTRUCTION OPTIMIZATION

(71) Applicant: International Business Machines Corporation, Armonk, NY (US)

(72) Inventors: Michael K Gschwind, Chappaqua, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/099,313

(22) Filed: Dec. 6, 2013

(65) Prior Publication Data

US 2014/0108771 A1   Apr. 17, 2014

Related U.S. Application Data

(63) Continuation of application No. 13/251,486, filed on Oct. 3, 2011.

(51) Int. Cl.
*G06F 9/30* (2006.01)
*G06F 9/38* (2006.01)

(52) U.S. Cl.
CPC .......... *G06F 9/30181* (2013.01); *G06F 9/3017* (2013.01); *G06F 9/30167* (2013.01); *G06F 9/384* (2013.01); *G06F 9/3832* (2013.01); *G06F 9/3851* (2013.01)

(58) Field of Classification Search
CPC .................................................. G06F 9/30185
USPC .......................................................... 712/226
See application file for complete search history.

(56) References Cited

U.S. PATENT DOCUMENTS

| 5,095,526 A | 3/1992 | Baum |
| 5,163,139 A | 11/1992 | Haigh et al. |
| 5,201,056 A * | 4/1993 | Daniel et al. ..................... 712/41 |
| 5,303,358 A | 4/1994 | Baum |

(Continued)

FOREIGN PATENT DOCUMENTS

| EP | 0780760 A2 | 6/1997 |
| JP | 2007304663 | 11/2007 |
| WO | WO 00/34844 | 6/2000 |

OTHER PUBLICATIONS

Zyuban et al "Inherently Lower-Power High-Performance Superscalar Architectures", IEEE Transactions on Computers, vol. 50, No. 3, Mar. 2001, pp. 268-285.

(Continued)

*Primary Examiner* — Eric Coleman
(74) *Attorney, Agent, or Firm* — William A. Kinnaman, Jr.

(57) ABSTRACT

Two computer machine instructions are fetched for execution, but replaced by a single optimized instruction to be executed, wherein a temporary register used by the two instructions is identified as a last-use register, where a last-use register has a value that is not to be accessed by later instructions, whereby the two computer machine instructions are replaced by a single optimized internal instruction for execution, the single optimized instruction not including the last-use register.

16 Claims, 11 Drawing Sheets

(56) References Cited

U.S. PATENT DOCUMENTS

| | | | |
|---|---|---|---|
| 5,737,629 | A | 4/1998 | Zuraski, Jr. et al. |
| 5,794,010 | A * | 8/1998 | Worrell et al. .................. 703/20 |
| 6,094,719 | A | 7/2000 | Panwar |
| 6,167,505 | A | 12/2000 | Kubota et al. |
| 6,189,088 | B1 | 2/2001 | Gschwind |
| 6,301,651 | B1 | 10/2001 | Chang et al. |
| 6,308,258 | B1 | 10/2001 | Kubota et al. |
| 6,314,511 | B2 | 11/2001 | Levy et al. |
| 6,349,383 | B1 | 2/2002 | Col et al. |
| 6,393,579 | B1 | 5/2002 | Piazza |
| 6,449,710 | B1 | 9/2002 | Isaman |
| 6,463,525 | B1 * | 10/2002 | Prabhu .......................... 712/222 |
| 6,651,160 | B1 * | 11/2003 | Hays ............................. 712/210 |
| 6,687,806 | B1 | 2/2004 | McGrath |
| 6,748,519 | B1 | 6/2004 | Moore |
| 6,950,926 | B1 | 9/2005 | Menezes |
| 7,131,017 | B2 | 10/2006 | Schmit et al. |
| 7,228,403 | B2 | 6/2007 | Leber et al. |
| 7,487,338 | B2 | 2/2009 | Matsuo |
| 7,500,126 | B2 | 3/2009 | Terechko et al. |
| 7,669,038 | B2 | 2/2010 | Burky et al. |
| 7,676,653 | B2 | 3/2010 | May |
| 7,739,442 | B2 | 6/2010 | Gonion |
| 7,739,482 | B2 | 6/2010 | Nguyen et al. |
| 7,769,885 | B1 | 8/2010 | Kompella |
| 7,805,536 | B1 | 9/2010 | Kompella |
| 7,827,388 | B2 | 11/2010 | Ward, III et al. |
| 7,941,651 | B1 | 5/2011 | Toll et al. |
| 7,975,134 | B2 | 7/2011 | Gonion |
| 2001/0052063 | A1 | 12/2001 | Tremblay et al. |
| 2002/0087955 | A1 * | 7/2002 | Ronen et al. .................. 717/151 |
| 2002/0116599 | A1 | 8/2002 | Kainaga et al. |
| 2002/0124155 | A1 | 9/2002 | Sami et al. |
| 2003/0154419 | A1 | 8/2003 | Zang et al. |
| 2003/0236965 | A1 | 12/2003 | Sheaffer |
| 2004/0064680 | A1 | 4/2004 | Kadambi et al. |
| 2005/0251662 | A1 | 11/2005 | Samra |
| 2006/0174089 | A1 | 8/2006 | Altman et al. |
| 2006/0190710 | A1 | 8/2006 | Rychlik |
| 2008/0016324 | A1 | 1/2008 | Burky et al. |
| 2008/0022044 | A1 | 1/2008 | Nunamaker et al. |
| 2008/0133893 | A1 | 6/2008 | Glew |
| 2008/0148022 | A1 | 6/2008 | Piry et al. |
| 2008/0282066 | A1 | 11/2008 | May |
| 2009/0019257 | A1 | 1/2009 | Shen et al. |
| 2009/0019263 | A1 | 1/2009 | Shen et al. |
| 2009/0055631 | A1 | 2/2009 | Burky et al. |
| 2009/0198986 | A1 | 8/2009 | Kissell |
| 2010/0064119 | A1 | 3/2010 | Arakawa |
| 2010/0095286 | A1 | 4/2010 | Kaplan |
| 2010/0312991 | A1 | 12/2010 | Norden et al. |
| 2010/0332803 | A1 | 12/2010 | Yoshida et al. |
| 2011/0087865 | A1 | 4/2011 | Barrick et al. |
| 2011/0099333 | A1 | 4/2011 | Sprangle et al. |

OTHER PUBLICATIONS

Svransky et al. "Lazy Retirement: A Power Aware Register Management Mechanism", Workshop on Complexity Efficient Design, 2002, pp. 1-9.

Franklin et al. "Register Traffic Analysis for Streamlining Inter-Operation Communication in Fine-Grain Parallel Processors", IEEE, SIGMICRO Newsletter 23, Dec. 1992, pp. 236-245.

Ponomarev et al. "Isolating Short-Lived Operands for Energy Reduction", IEEE Transactions on Computers, vol. 53, No. 6, Jun. 2004, pp. 697-709.

Lozano et al. "Exploiting Short-Lived Variables in Superscalar Processors", 1995 Proceedings of MICRO-28, pp. 292-302.

Shrivastava et al. "Compilation Framework for Code Size Reduction Using Reduced Bit-Width ISAs", ACM Transactions on Design Automation of Electronic Systems, vol. 11, Issue 1, Jan. 2006.

Bednarski et al. "Energy-Optimal Integrated VLIW Code Generation", Proceedings of 11th Workshop on Compilers for Parallel Computers, 2004, pp. 1-14.

Zeng et al. "Register File Caching for Energy Efficiency", 2010 43rd Annual IEEE ACM International Symposium on Microarchitecture (MICRO), Dec. 2010, pp. 301-312.

Tan et al. "Register Caching as a Way of Mitigating Intercluster Communication Penalties in Clustered Microarchtectures", 2008 International Conference on Computing and Electrical Engineering, Dec. 2008, pp. 194-198.

Shioya et al. "Register Cache System not for Latency Reduction Purpose", 2010 43rd Annual IEEE ACM International Symposium on Microarchitecture, Dec. 2010, pp. 301-312.

Cruz et al. "Multiple-Banked Register File Architecture", Proceedings of the 27th International Symposium on Computer Architecture, Jun. 2000, pp. 316-325.

Butts et al. "Use-Based Register Caching with Decoupled Indexing", Proceedings of the 31st Annual Symposium on Computer Architecture, Jun. 2004, pp. 1-12.

\* cited by examiner

USING REGISTER LAST USE INFORMATION TO PERFORM DECODE TIME COMPUTER INSTRUCTION OPTIMIZATION

CROSS-REFERENCE TO RELATED APPLICATION

This is a Continuation application to U.S. patent Ser. No. 13/251,486 "USING REGISTER LAST-USE INFORMATION TO PERFORM DECODE-TIME COMPUTER INSTRUCTION OPTIMIZATION", filed Oct. 3, 2011, which application is incorporated herein by reference.

FIELD OF THE INVENTION

The disclosure relates to the field of processors and, more particularly, to decode time instruction optimization in a processor.

BACKGROUND

According to Wikipedia, published Aug. 1, 2011 on the world wide web, "Multithreading Computers" have hardware support to efficiently execute multiple threads. These are distinguished from multiprocessing systems (such as multi-core systems) in that the threads have to share the resources of a single core: the computing units, the CPU caches and the translation lookaside buffer (TLB). Where multiprocessing systems include multiple complete processing units, multi-threading aims to increase utilization of a single core by using thread-level as well as instruction-level parallelism. As the two techniques are complementary, they are sometimes combined in systems with multiple multithreading CPUs and in CPUs with multiple multithreading cores.

The Multithreading paradigm has become more popular as efforts to further exploit instruction level parallelism have stalled since the late-1990s. This allowed the concept of Throughput Computing to re-emerge to prominence from the more specialized field of transaction processing:

Even though it is very difficult to further speed up a single thread or single program, most computer systems are actually multi-tasking among multiple threads or programs.

Techniques that would allow speed up of the overall system throughput of all tasks would be a meaningful performance gain.

The two major techniques for throughput computing are multiprocessing and multithreading.

Some advantages include:

If a thread gets a lot of cache misses, the other thread(s) can continue, taking advantage of the unused computing resources, which thus can lead to faster overall execution, as these resources would have been idle if only a single thread was executed.

If a thread cannot use all the computing resources of the CPU (because instructions depend on each other's result), running another thread permits to not leave these idle.

If several threads work on the same set of data, they can actually share their cache, leading to better cache usage or synchronization on its values.

Some criticisms of multithreading include:

Multiple threads can interfere with each other when sharing hardware resources such as caches or translation lookaside buffers (TLBs).

Execution times of a single thread are not improved but can be degraded, even when only one thread is executing. This is due to slower frequencies and/or additional pipeline stages that are necessary to accommodate thread-switching hardware.

Hardware support for multithreading is more visible to software, thus requiring more changes to both application programs and operating systems than Multiprocessing.

Types of Multithreading:

Block Multi-Threading Concept

The simplest type of multi-threading occurs when one thread runs until it is blocked by an event that normally would create a long latency stall. Such a stall might be a cache-miss that has to access off-chip memory, which might take hundreds of CPU cycles for the data to return. Instead of waiting for the stall to resolve, a threaded processor would switch execution to another thread that was ready to run. Only when the data for the previous thread had arrived, would the previous thread be placed back on the list of ready-to-run threads.

For example:
1. Cycle i: instruction j from thread A is issued
2. Cycle i+1: instruction j+1 from thread A is issued
3. Cycle i+2: instruction j+2 from thread A is issued, load instruction which misses in all caches
4. Cycle i+3: thread scheduler invoked, switches to thread B
5. Cycle i+4: instruction k from thread B is issued
6. Cycle i+5: instruction k+1 from thread B is issued Conceptually, it is similar to cooperative multi-tasking used in real-time operating systems in which tasks voluntarily give up execution time when they need to wait upon some type of the event.

This type of multi threading is known as Block or Cooperative or Coarse-grained multithreading.

Hardware Cost

The goal of multi-threading hardware support is to allow quick switching between a blocked thread and another thread ready to run. To achieve this goal, the hardware cost is to replicate the program visible registers as well as some processor control registers (such as the program counter). Switching from one thread to another thread means the hardware switches from using one register set to another.

Such Additional Hardware has these Benefits:

The thread switch can be done in one CPU cycle.

It appears to each thread that it is executing alone and not sharing any hardware resources with any other threads. This minimizes the amount of software changes needed within the application as well as the operating system to support multi-threading.

In order to switch efficiently between active threads, each active thread needs to have its own register set. For example, to quickly switch between two threads, the register hardware needs to be instantiated twice.

EXAMPLES

Many families of microcontrollers and embedded processors have multiple register banks to allow quick context switching for interrupts. Such schemes can be considered a type of block multithreading among the user program thread and the interrupt threads Interleaved Multi-Threading
1. Cycle i+1: an instruction from thread B is issued
2. Cycle i+2: an instruction from thread C is issued The purpose of this type of multithreading is to remove all data dependency stalls from the execution pipeline. Since one thread is relatively independent from other threads, there's less chance of one instruction in one pipe stage needing an output from an older instruction in the pipeline.

Conceptually, it is similar to pre-emptive multi-tasking used in operating systems. One can make the analogy that the time-slice given to each active thread is one CPU cycle.

This type of multithreading was first called Barrel processing, in which the staves of a barrel represent the pipeline stages and their executing threads. Interleaved or Pre-emptive or Fine-grained or time-sliced multithreading are more modern terminology.

Hardware Costs

In addition to the hardware costs discussed in the Block type of multithreading, interleaved multithreading has an additional cost of each pipeline stage tracking the thread ID of the instruction it is processing. Also, since there are more threads being executed concurrently in the pipeline, shared resources such as caches and TLBs need to be larger to avoid thrashing between the different threads.

Simultaneous Multi-Threading

Concept

The most advanced type of multi-threading applies to superscalar processors. A normal superscalar processor issues multiple instructions from a single thread every CPU cycle. In Simultaneous Multi-threading (SMT), the superscalar processor can issue instructions from multiple threads every CPU cycle. Recognizing that any single thread has a limited amount of instruction level parallelism, this type of multithreading tries to exploit parallelism available across multiple threads to decrease the waste associated with unused issue slots.

For example:

1. Cycle i: instructions j and j+1 from thread A; instruction k from thread B all simultaneously issued
2. Cycle i+1: instruction j+2 from thread A; instruction k+1 from thread B; instruction m from thread C all simultaneously issued
3. Cycle i+2: instruction j+3 from thread A: instructions m+1 and m+2 from thread C all simultaneously issued.

To distinguish the other types of multithreading from SMT, the term Temporal multithreading is used to denote when instructions from only one thread can be issued at a time.

Hardware Costs

In addition to the hardware costs discussed for interleaved multithreading. SMT has the additional cost of each pipeline stage tracking the Thread ID of each instruction being processed. Again, shared resources such as caches and TLBs have to be sized for the large number of active threads.

According to U.S. Pat. No. 7,827,388 "Apparatus for adjusting instruction thread priority in a multi-thread processor" issued Nov. 2, 2010, a assigned to IBM and incorporated by reference herein, a number of techniques are used to improve the speed at which data processors execute software programs. These techniques include increasing the processor clock speed, using cache memory, and using predictive branching. Increasing the processor clock speed allows a processor to perform relatively more operations in any given period of time. Cache memory is positioned in close proximity to the processor and operates at higher speeds than main memory, thus reducing the time needed for a processor to access data and instructions. Predictive branching allows a processor to execute certain instructions based on a prediction about the results of an earlier instruction, thus obviating the need to wait for the actual results and thereby improving processing speed.

Some processors also employ pipelined instruction execution to enhance system performance. In pipelined instruction execution, processing tasks are broken down into a number of pipeline steps or stages. Pipelining may increase processing speed by allowing subsequent instructions to begin processing before previously issued instructions have finished a particular process. The processor does not need to wait for one instruction to be fully processed before beginning to process the next instruction in the sequence.

Processors that employ pipelined processing may include a number of different pipeline stages which are devoted to different activities in the processor. For example, a processor may process sequential instructions in a fetch stage, decode/dispatch stage, issue stage, execution stage, finish stage, and completion stage. Each of these individual stages may employ its own set of pipeline stages to accomplish the desired processing tasks.

Multi-thread instruction processing is an additional technique that may be used in conjunction with pipelining to increase processing speed. Multi-thread instruction processing involves dividing a set of program instructions into two or more distinct groups or threads of instructions. This multithreading technique allows instructions from one thread to be processed through a pipeline while another thread may be unable to be processed for some reason. This avoids the situation encountered in single-threaded instruction processing in which all instructions are held up while a particular instruction cannot be executed, such as, for example, in a cache miss situation where data required to execute a particular instruction is not immediately available. Data processors capable of processing multiple instruction threads are often referred to as simultaneous multithreading (SMT) processors.

It should be noted at this point that there is a distinction between the way the software community uses the term "multithreading" and the way the term "multithreading" is used in the computer architecture community. The software community uses the term "multithreading" to refer to a single task subdivided into multiple, related threads. In computer architecture, the term "multithreading" refers to threads that may be independent of each other. The term "multithreading" is used in this document in the same sense employed by the computer architecture community.

To facilitate multithreading, the instructions from the different threads are interleaved in some fashion at some point in the overall processor pipeline. There are generally two different techniques for interleaving instructions for processing in a SMT processor. One technique involves interleaving the threads based on some long latency event, such as a cache miss that produces a delay in processing one thread. In this technique all of the processor resources are devoted to a single thread until processing of that thread is delayed by some long latency event. Upon the occurrence of the long latency event, the processor quickly switches to another thread and advances that thread until some long latency event occurs for that thread or until the circumstance that stalled the other thread is resolved.

The other general technique for interleaving instructions from multiple instruction threads in a SMT processor involves interleaving instructions on a cycle-by-cycle basis according to some interleaving rule (also sometimes referred to herein as an interleave rule). A simple cycle-by-cycle interleaving technique may simply interleave instructions from the different threads on a one-to-one basis. For example, a two-thread SMT processor may take an instruction from a first thread in a first clock cycle, an instruction from a second thread in a second clock cycle, another instruction from the first thread in a third clock cycle and so forth, back and forth between the two instruction threads. A more complex cycle-by-cycle interleaving technique may involve using software instructions to assign a priority to each instruction thread and then interleaving instructions from the different threads to enforce some rule based upon the relative thread priorities. For example, if one thread in a two-thread SMT processor is assigned a higher priority than the other thread, a simple interleaving rule may require that twice as many instructions from the higher priority thread be included in the interleaved stream as compared to instructions from the lower priority thread.

A more complex cycle-by-cycle interleaving rule in current use assigns each thread a priority from "1" to "7" and places an instruction from the lower priority thread into the interleaved stream of instructions based on the function $1/(2|X-Y|+1)$, where X=the software assigned priority of a first thread, and Y=the software assigned priority of a second thread. In the case where two threads have equal priority, for example, X=3 and Y=3, the function produces a ratio of 1/2, and an instruction from each of the two threads will be included in the interleaved instruction stream once out of every two clock cycles. If the thread priorities differ by 2, for example, X=2 and Y=4, then the function produces a ratio of 1/8, and an instruction from the lower priority thread will be included in the interleaved instruction stream once out of every eight clock cycles.

Using a priority rule to choose how often to include instructions from particular threads is generally intended to ensure that processor resources are allotted based on the software assigned priority of each thread. There are, however, situations in which relying on purely software assigned thread priorities may not result in an optimum allotment of processor resources. In particular, software assigned thread priorities cannot take into account processor events, such as a cache miss, for example, that may affect the ability of a particular thread of instructions to advance through a processor pipeline. Thus, the occurrence of some event in the processor may completely or at least partially defeat the goal of assigning processor resources efficiently between different instruction threads in a multi-thread processor.

For example, a priority of 5 may be assigned by software to a first instruction thread in a two thread system, while a priority of 2 may be assigned by software to a second instruction thread. Using the priority rule $1/(2|X-Y|+1)$ described above, these software assigned priorities would dictate that an instruction from the lower priority thread would be interleaved into the interleaved instruction stream only once every sixteen clock cycles, while instructions from the higher priority instruction thread would be interleaved fifteen out of every sixteen clock cycles. If an instruction from the higher priority instruction thread experiences a cache miss, the priority rule would still dictate that fifteen out of every sixteen instructions comprise instructions from the higher priority instruction thread, even though the occurrence of the cache miss could effectively stall the execution of the respective instruction thread until the data for the instruction becomes available.

In an embodiment, each instruction thread in a SMT processor is associated with a software assigned base input processing priority. Unless some predefined event or circumstance occurs with an instruction being processed or to be processed, the base input processing priorities of the respective threads are used to determine the interleave frequency between the threads according to some instruction interleave rule. However, upon the occurrence of some predefined event or circumstance in the processor related to a particular instruction thread, the base input processing priority of one or more instruction threads is adjusted to produce one more adjusted priority values. The instruction interleave rule is then enforced according to the adjusted priority value or values together with any base input processing priority values that have not been subject to adjustment.

Intel® Hyper-threading is described in "Intel® Hyper-Threading Technology. Technical User's Guide" 2003 from Intel® corporation, incorporated herein by reference. According to the Technical User's Guide, efforts to improve system performance on single processor systems have traditionally focused on making the processor more capable. These approaches to processor design have focused on making it possible for the processor to process more instructions faster through higher clock speeds, instruction-level parallelism (ILP) and caches. Techniques to achieve higher clock speeds include pipelining the microarchitecture to finer granularities, which is also called super-pipelining. Higher clock frequencies can greatly improve performance by increasing the number of instructions that can be executed each second. But because there are far more instructions being executed in a super-pipelined microarchitecture, handling of events that disrupt the pipeline, such as cache misses, interrupts and branch mispredictions, is much more critical and failures more costly. ILP refers to techniques to increase the number of instructions executed each clock cycle. For example, many super-scalar processor implementations have multiple execution units that can process instructions simultaneously. In these super-scalar implementations, several instructions can be executed each clock cycle. With simple in-order execution, however, it is not enough to simply have multiple execution units. The challenge is to find enough instructions to execute. One technique is out-of-order execution where a large window of instructions is simultaneously evaluated and sent to execution units, based on instruction dependencies rather than program order. Accesses to system memory are slow, though faster than accessing the hard disk, but when compared to execution speeds of the processor, they are slower by orders of magnitude. One technique to reduce the delays introduced by accessing system memory (called latency) is to add fast caches close to the processor. Caches provide fast memory access to frequently accessed data or instructions. As cache speeds increase, however, so does the problem of heat dissipation and of cost. For this reason, processors often are designed with a cache hierarchy in which fast, small caches are located near and operated at access latencies close to that of the processor core. Progressively larger caches, which handle less frequently accessed data or instructions, are implemented with longer access latencies. Nonetheless, times can occur when the needed data is not in any processor cache. Handling such cache misses requires accessing system memory or the hard disk, and during these times, the processor is likely to stall while waiting for memory transactions to finish. Most techniques for improving processor performance from one generation to the next are complex and often add significant die-size and power costs. None of these techniques operate at 100 percent efficiency thanks to limited parallelism in instruction flows. As a result, doubling the number of execution units in a processor does not double the performance of the processor. Similarly, simply doubling the clock rate does not double the performance due to the number of processor cycles lost to a slower memory subsystem.

Multithreading

As processor capabilities have increased, so have demands on performance, which has increased pressure on processor resources with maximum efficiency. Noticing the time that processors wasted running single tasks while waiting for certain events to complete, software developers began wondering if the processor could be doing some other work at the same time.

To arrive at a solution, software architects began writing operating systems that supported running pieces of programs, called threads. Threads are small tasks that can run independently. Each thread gets its own time slice, so each thread represents one basic unit of processor utilization. Threads are organized into processes, which are composed of one or more threads. All threads in a process share access to the process resources.

These multithreading operating systems made it possible for one thread to run while another was waiting for something to happen. On Intel processor-based personal computers and servers, today's operating systems, such as Microsoft Windows* 2000 and Windows* XP, all support multithreading. In fact, the operating systems themselves are multithreaded. Portions of them can run while other portions are stalled.

To benefit from multithreading, programs need to possess executable sections that can run in parallel. That is, rather than being developed as a long single sequence of instructions, programs are broken into logical operating sections. In this way, if the application performs operations that run independently of each other, those operations can be broken up into threads whose execution is scheduled and controlled by the operating system. These sections can be created to do different things, such as allowing Microsoft Word* to repaginate a document while the user is typing. Repagination occurs on one thread and handling keystrokes occurs on another. On single processor systems, these threads are executed sequentially, not concurrently. The processor switches back and forth between the keystroke thread and the repagination thread quickly enough that both processes appear to occur simultaneously. This is called functionally decomposed multithreading.

Multithreaded programs can also be written to execute the same task on parallel threads. This is called data-decomposed multithreaded, where the threads differ only in the data that is processed. For example, a scene in a graphic application could be drawn so that each thread works on half of the scene. Typically, data-decomposed applications are threaded for throughput performance while functionally decomposed applications are threaded for user responsiveness or functionality concerns.

When multithreaded programs are executing on a single processor machine, some overhead is incurred when switching context between the threads. Because switching between threads costs time, it appears that running the two threads this way is less efficient than running two threads in succession. If either thread has to wait on a system device for the user, however, the ability to have the other thread continue operating compensates very quickly for all the overhead of the switching. Since one thread in the graphic application example handles user input, frequent periods when it is just waiting certainly occur. By switching between threads, operating systems that support multithreaded programs can improve performance and user responsiveness, even if they are running on a single processor system.

In the real world, large programs that use multithreading often run many more than two threads. Software such as database engines creates a new processing thread for every request for a record that is received. In this way, no single I/O operation prevents new requests from executing and bottlenecks can be avoided. On some servers, this approach can mean that thousands of threads are running concurrently on the same machine.

Multiprocessing

Multiprocessing systems have multiple processors running at the same time. Traditional Intel® architecture multiprocessing systems have anywhere from two to about 512 processors. Multiprocessing systems allow different threads to run on different processors. This capability considerably accelerates program performance. Now two threads can run more or less independently of each other without requiring thread switches to get at the resources of the processor. Multiprocessor operating systems are themselves multithreaded, and the threads can use the separate processors to the best advantage.

Originally, there were two kinds of multiprocessing: asymmetrical and symmetrical. On an asymmetrical system, one or more processors were exclusively dedicated to specific tasks, such as running the operating system. The remaining processors were available for all other tasks (generally, the user applications). It quickly became apparent that this configuration was not optimal. On some machines, the operating system processors were running at 100 percent capacity, while the user-assigned processors were doing nothing. In short order, system designers came to favor an architecture that balanced the processing load better: symmetrical multiprocessing (SMP). The "symmetry" refers to the fact that any thread—be it from the operating system or the user application—can run on any processor. In this way, the total computing load is spread evenly across all computing resources. Today, symmetrical multiprocessing systems are the norm and asymmetrical designs have nearly disappeared.

SMP systems use double the number of processors, however performance will not double. Two factors that inhibit performance from simply doubling are:

How well the workload can be parallelized

System overhead

Two factors govern the efficiency of interactions between threads:

How they compete for the same resources

How they communicate with other threads

Multiprocessor Systems

Today's server applications consist of multiple threads or processes that can be executed in parallel. Online transaction processing and Web services have an abundance of software threads that can be executed simultaneously for faster performance. Even desktop applications are becoming increasingly parallel. Intel architects have implemented thread-level parallelism (TLP) to improve performance relative to transistor count and power consumption.

In both the high-end and mid-range server markets, multiprocessors have been commonly used to get more performance from the system. By adding more processors, applications potentially get substantial performance improvement by executing multiple threads on multiple processors at the same time. These threads might be from the same application, from different applications running simultaneously, from operating-system services, or from operating-system threads doing background maintenance. Multiprocessor systems have been used for many years, and programmers are familiar with the techniques to exploit multiprocessors for higher performance levels.

US Patent Application Publication No. 2011/0087865 "Intermediate Register Mapper" filed Apr. 14, 2011 by Barrick et al. and incorporated herein by reference teaches "A method, processor, and computer program product employing an intermediate register mapper within a register renaming mechanism. A logical register lookup determines whether a hit to a logical register associated with the dispatched instruction has occurred. In this regard, the logical register lookup searches within at least one register mapper from a group of register mappers, including an architected register mapper, a unified main mapper, and an intermediate register mapper. A single hit to the logical register is selected among the group of register mappers. If an instruction having a mapper entry in the unified main mapper has finished but has not completed, the mapping contents of the register mapper entry in the unified main mapper are moved to the intermediate register mapper, and the unified register mapper entry is released, thus increasing a number of unified main mapper entries available for reuse."

U.S. Pat. No. 6,314,511 filed Apr. 2, 1998 "Mechanism for freeing registers on processors that perform dynamic out-of-order execution of instructions using renaming registers" by Levy et al., incorporated by reference herein teaches "freeing renaming registers that have been allocated to architectural registers prior to another instruction redefining the architectural register. Renaming registers are used by a processor to dynamically execute instructions out-of-order in either a single or multi-threaded processor that executes instructions out-of-order. A mechanism is described for freeing renaming registers that consists of a set of instructions, used by a compiler, to indicate to the processor when it can free the physical (renaming) register that is allocated to a particular architectural register. This mechanism permits the renaming register to be reassigned or reallocated to store another value as soon as the renaming register is no longer needed for allocation to the architectural register. There are at least three ways to enable the processor with an instruction that identifies the renaming register to be freed from allocation: (1) a user may explicitly provide the instruction to the processor that refers to a particular renaming register: (2) an operating system may provide the instruction when a thread is idle that refers to a set of registers associated with the thread; and (3) a compiler may include the instruction with the plurality of instructions presented to the processor. There are at least five embodiments of the instruction provided to the processor for freeing renaming registers allocated to architectural registers: (1) Free Register Bit; (2) Free Register; (3) Free Mask: (4) Free Opcode; and (5) Free Opcode/Mask. The Free Register Bit instruction provides the largest speedup for an out-of-order processor and the Free Register instruction provides the smallest speedup."

"Power ISA™ Version 2.06 Revision B" published Jul. 23, 2010 from IBM® and incorporated by reference herein teaches an example RISC (reduced instruction set computer) instruction set architecture. The Power ISA will be used herein in order to demonstrate example embodiments, however, the invention is not limited to Power ISA or RISC architectures. Those skilled in the art will readily appreciate use of the invention in a variety of architectures.

"z/Architecture Principles of Operation" SA22-7832-08, Ninth Edition (August, 2010) from IBM® and incorporated by reference herein teaches an example CISC (complex instruction set computer) instruction set architecture.

SUMMARY

Two computer machine instructions are fetched for execution, but replaced by a single optimized instruction to be executed, wherein a temporary register used by the two instructions is identified as a last-use register, where a last-use register has a value that is not to be accessed by later instructions, whereby the two computer machine instructions are replaced by a single optimized internal instruction for execution, the single optimized instruction not including the last-use register.

In an embodiment, two instructions to be executed are determined to be candidates for optimization to a single optimized internal instruction, the two instructions comprising a first instruction identifying a first operand as a target operand and a second instruction identifying the first operand as a source operand, the first instruction preceding the second instruction in program order. The first operand is determined to be specified as a last-use operand. The single optimized internal instruction is created based on the two instructions, wherein the single optimized internal instruction does not specify the first operand. The single optimized internal instruction is executed instead of the two instructions.

In an embodiment, the first instruction includes a first immediate field and the second instruction comprises a second immediate field. At least part of the first immediate field is concatenated with at least a part of the second immediate field to create a combined immediate field of the single optimized internal instruction.

In an embodiment, the single optimized internal instruction is created responsive to the at least part of the first immediate field or the at least a part of the second immediate field forming most significant bits of the combined immediate field have a predetermined number of high order 0's.

In an embodiment, it is determined that the at least part of the first immediate field or the at least part of the second immediate field used forming least significant bits of the combined immediate field is a negative value, and an indication is provided that a 1 must be subtract from most significant bits of the combined immediate field for executing the single optimized internal instruction.

In an embodiment, the first instruction includes a first immediate field and the second instruction comprises a second immediate field. The two instructions to be executed are determined to be candidates for optimization to two optimized internal instructions rather than being candidates for optimization to the single optimized internal instruction, the two instructions comprising the first instruction identifying the first operand as a target operand and the second instruction identifying the first operand as the source operand, the first instruction preceding the second instruction in program order. A first internal instruction is created based on the first instruction. At least part of the first immediate field is concatenated with at least a part of the second immediate field to create a combined immediate field of a optimized second internal instruction wherein out-of-order execution of the first internal instruction and the optimized internal second instruction is permitted rather than in-order execution of the two instructions.

In an embodiment, the first instruction includes a first register field and the second instruction comprises a second register field wherein, the first register field and the second register field are included in the created single optimized internal instruction.

In an embodiment, the first instruction is a prefix instruction for specifying the first operand of the second instruction as a last-use operand.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
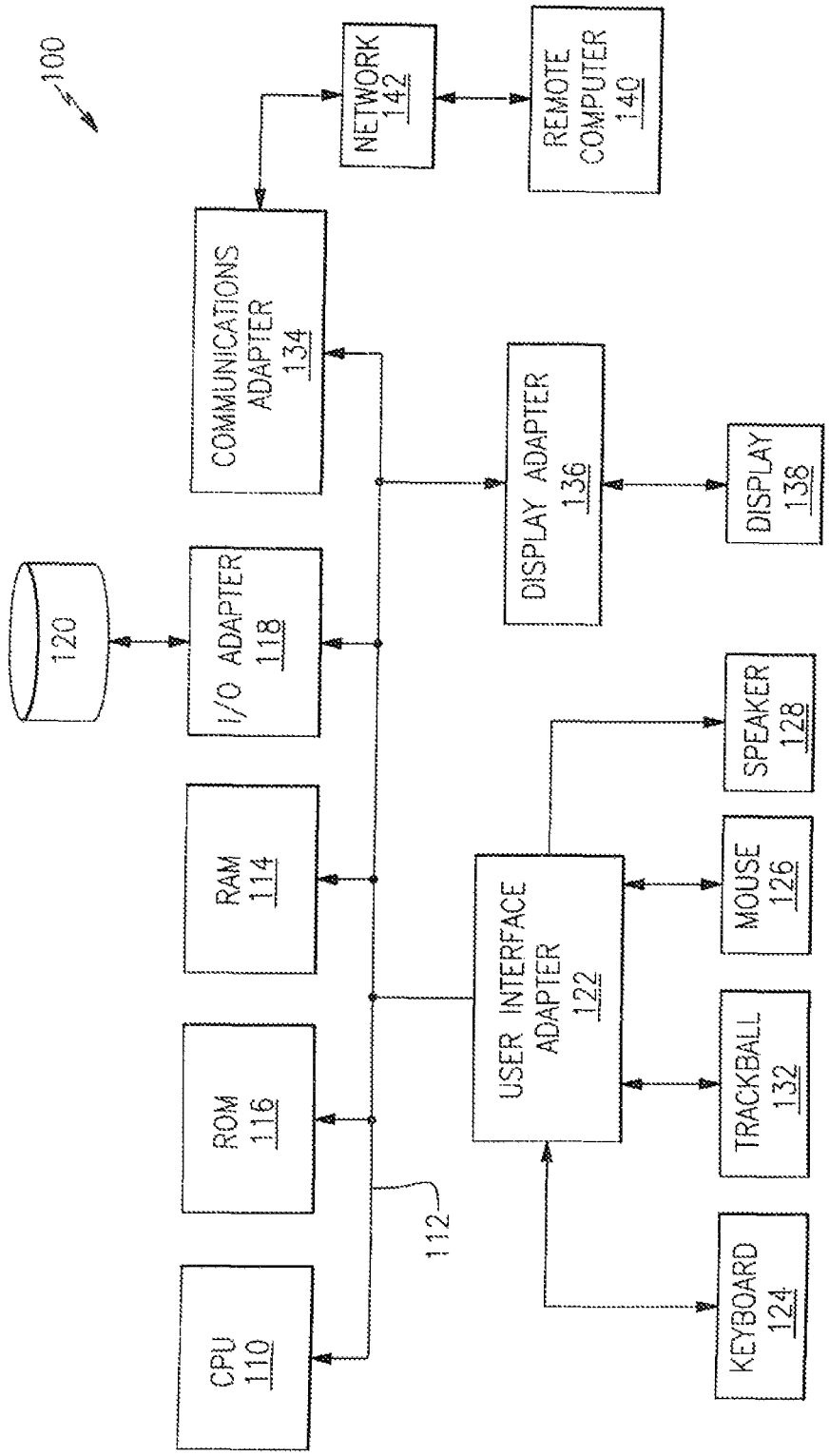
FIG. 1 depicts an example processor system configuration.

An Out of Order (OoO) processor typically contains multiple execution pipelines that may opportunistically execute instructions in a different order than what the program sequence (or "program order") specifies in order to maximize the average instruction per cycle rate by reducing data dependencies and maximizing utilization of the execution pipelines allocated for various instruction types. Results of instruction execution are typically held temporarily in the physical registers of one or more register files of limited depth. An OoO processor typically employs register renaming to avoid unnecessary serialization of instructions due to the reuse of a given architected register by subsequent instructions in the program order.

According to Barrick, under register renaming operations, each architected (i.e., logical) register targeted by an instruction is mapped to a unique physical register in a register file. In current high-performance OoO processors, a unified main mapper is utilized to manage the physical registers within multiple register files. In addition to storing the logical-to-physical register translation (i.e., in mapper entries), the unified main mapper is also responsible for storing dependency data (i.e., queue position data), which is important for instruction ordering upon completion.

In a unified main mapper-based renaming scheme, it is desirable to free mapper entries as soon as possible for reuse by the OoO processor. However, in the prior art, a unified main mapper entry cannot be freed until the instruction that writes to a register mapped by the mapper entry is completed. This constraint is enforced because, until completion, there is a possibility that an instruction that has "finished" (i.e., the particular execution unit (EU) has successfully executed the instruction) will still be flushed before the instruction can "complete" and before the architected, coherent state of the registers is updated.

In current implementations, resource constraints at the unified main mapper have generally been addressed by increasing the number of unified main mapper entries. However, increasing the size of the unified main mapper has a concomitant penalty in terms of die area, complexity, power consumption, and access time.

In Barrick, there is provided a method for administering a set of one or more physical registers in a data processing system. The data processing system has a processor that processes instructions out-of-order, wherein the instructions reference logical registers and wherein each of the logical registers is mapped to the set of one or more physical registers. In response to dispatch of one or more of the instructions, a register management unit performs a logical register lookup, which determines whether a hit to a logical register associated with the dispatched instruction has occurred within one or more register mappers. In this regard, the logical register lookup searches within at least one register mapper from a group of register mappers, including an architected register mapper, a unified main mapper, and an intermediate register mapper. The register management unit selects a single hit to the logical register among the group of register mappers. If an instruction having a mapper entry in the unified main mapper has finished but has not completed, the register management unit moves logical-to-physical register renaming data of the unified main mapping entry in the unified main mapper to the intermediate register mapper, and the unified main mapper releases the unified main mapping entry prior to completion of the instruction. The release of the unified main mapping entry increases a number of unified main mapping entries available for reuse.

With reference now to the figures, and in particular to FIG. 1, an example is shown of a data processing system 100 which may include an OoO processor employing an intermediate register mapper as described below with reference to FIG. 2. As shown in FIG. 1, data processing system 100 has a central processing unit (CPU) 110, which may be implemented with processor 200 of FIG. 2. CPU 110 is coupled to various other components by an interconnect 112. Read only memory ("ROM") 116 is coupled to the interconnect 112 and includes a basic input/output system ("BIOS") that controls certain basic functions of the data processing system 100. Random access memory ("RAM") 114. I/O adapter 118, and communications adapter 134 are also coupled to the system bus 112. I/O adapter 118 may be a small computer system interface ("SCSI") adapter that communicates with a storage device 120. Communications adapter 134 interfaces interconnect 112 with network 140, which enables data processing system 100 to communicate with other such systems, such as remote computer 142. Input/Output devices are also connected to interconnect 112 via user interface adapter 122 and display adapter 136. Keyboard 124, track ball 132, mouse 126 and speaker 128 are all interconnected to bus 112 via user interface adapter 122. Display 138 is connected to system bus 112 by display adapter 136. In this manner, data processing system 100 receives input, for example, throughout keyboard 124, trackball 132, and/or mouse 126 and provides output, for example, via network 142, on storage device 120, speaker 128 and/or display 138. The hardware elements depicted in data processing system 100 are not intended to be exhaustive, but rather represent principal components of a data processing system in one embodiment.

Operation of data processing system 100 can be controlled by program code, such as firmware and/or software, which typically includes, for example, an operating system such as AIX® ("AIX" is a trademark of the IBM Corporation) and one or more application or middleware programs. Such program code comprises instructions discussed below with reference to FIG. 2.

Figure 2:
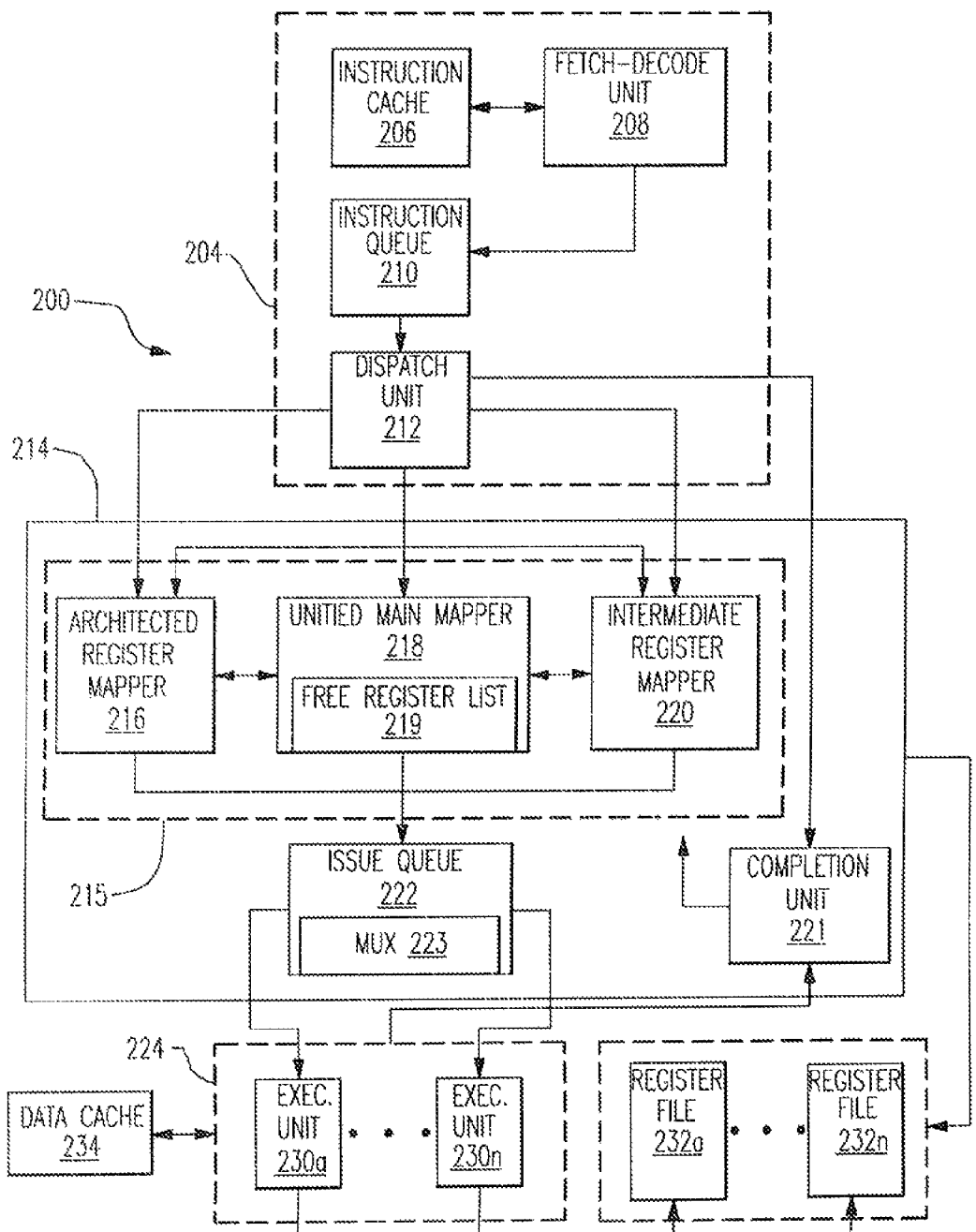
FIG. 2 depicts a first example processor pipeline.

Referring now to FIG. 2, there is depicted a superscalar processor 200. Instructions are retrieved from memory (e.g. RAM 114 of FIG. 1) and loaded into instruction sequencing logic (ISL) 204, which includes Level 1 Instruction cache (L1

I-cache) 206, fetch-decode unit 208, instruction queue 210 and dispatch unit 212. Specifically, the instructions are loaded in L1 I-cache 206 of ISL 204. The instructions are retained in L I-cache 206 until they are required, or replaced if they are not needed. Instructions are retrieved from L1 I-cache 206 and decoded by fetch-decode unit 208. After decoding a current instruction, the current instruction is loaded into instruction queue 210. Dispatch unit 212 dispatches instructions from instruction queue 210 into register management unit 214, as well as completion unit 240. Completion unit 240 is coupled to general execution unit 224 and register management unit 214, and monitors when an issued instruction has completed.

When dispatch unit 212 dispatches a current instruction, unified main mapper 218 of register management unit 214 allocates and maps a destination logical register number to a physical register within physical register files 232a-232n that is not currently assigned to a logical register. The destination is said to be renamed to the designated physical register among physical register files 232a-232n. Unified main mapper 218 removes the assigned physical register from a list 219 of free physical registers stored within unified main mapper 218. All subsequent references to that destination logical register will point to the same physical register until fetch-decode unit 208 decodes another instruction that writes to the same logical register. Then, unified main mapper 218 renames the logical register to a different physical location selected from free list 219, and the mapper is updated to enter the new logical-to-physical register mapper data. When the logical-to-physical register mapper data is no longer needed, the physical registers of old mappings are returned to free list 219. If free physical register list 219 does not have enough physical registers, dispatch unit 212 suspends instruction dispatch until the needed physical registers become available.

After the register management unit 214 has mapped the current instruction, issue queue 222 issues the current instruction to general execution engine 224, which includes execution units (EUs) 230a-230n. Execution units 230a-230n are of various types, such as floating-point (FP), fixed-point (FX), and load/store (LS). General execution engine 224 exchanges data with data memory (e.g. RAM 114, ROM 116 of FIG. 1) via a data cache 234. Moreover, issue queue 222 may contain instructions of IP type, FX type, and LS instructions. However, it should be appreciated that any number and types of instructions can be used. During execution, EUs 230a-230n obtain the source operand values from physical locations in register file 232a-232n and store result data, if any, in register files 232a-232n and/or data cache 234.

Still referring to FIG. 2, register management unit 214 includes: (i) mapper cluster 215, which includes architected register mapper 216, unified main mapper 218, intermediate register mapper 220, and (ii) issue queue 222. Mapper cluster 215 tracks the physical registers assigned to the logical registers of various instructions. In an exemplary embodiment, architected register mapper 216 has 16 logical (i.e., not physically mapped) registers of each type that store the last, valid (i.e., checkpointed) state of logical-to-physical register mapper data. However, it should be recognized that different processor architectures can have more or less logical registers, as described in the exemplary embodiment. Architected register mapper 216 includes a pointer list that identifies a physical register which describes the checkpointed state. Physical register files 232a-232n will typically contain more registers than the number of entries in architected register mapper 216. It should be noted that the particular number of physical and logical registers that are used in a renaming mapping scheme can vary.

In contrast, unified main mapper 218 is typically larger (typically contains up to 20 entries) than architected register mapper 216. Unified main mapper 218 facilitates tracking of the transient state of logical-to-physical register mappings. The term "transient" refers to the fact that unified main mapper 218 keeps track of tentative logical-to-physical register mapping data as the instructions are executed out-of-order. OoO execution typically occurs when there are older instructions which would take longer (i.e., make use of more clock cycles) to execute than newer instructions in the pipeline. However, should an OoO instruction's executed result require that it be flushed for a particular reason (e.g. a branch miss-prediction), the processor can revert to the check-pointed state maintained by architected register mapper 216 and resume execution from the last, valid state.

Unified main mapper 218 makes the association between physical registers in physical register files 232a-232n and architected register mapper 216. The qualifying term "unified" refers to the fact that unified main mapper 218 obviates the complexity of custom-designing a dedicated mapper for each of register files 232 (e.g., general-purpose registers (GPRs), floating-point registers (FPRs), fixed-point registers (FXPs), exception registers (XERs), condition registers (CRs), etc.).

In addition to creating a transient, logical-to-physical register mapper entry of an OoO instruction, unified main mapper 218 also keeps track of dependency data (i.e. instructions that are dependent upon the finishing of an older instruction in the pipeline), which is important for instruction ordering. Conventionally, once unified main mapper 218 has entered an instruction's logical-to-physical register translation, the instruction passes to issue queue 222. Issue queue 222 serves as the gatekeeper before the instruction is issued to execution unit 230 for execution. As a general rule, an instruction cannot leave issue queue 222 if it depends upon an older instruction to finish. For this reason, unified main mapper 218 tracks dependency data by storing the issue queue position data for each instruction that is mapped. Once the instruction has been executed by general execution engine 224, the instruction is said to have "finished" and is retired from issue queue 222.

Register management unit 214 may receive multiple instructions from dispatch unit 212 in a single cycle so as to maintain a filled, single issue pipeline. The dispatching of instructions is limited by the number of available entries in unified main mapper 218. In conventional mapper systems, which lack intermediate register mapper 220, if unified main mapper 218 has a total of 20 mapper entries, there is a maximum of 20 instructions that can be in flight (i.e., not check-pointed) at once. Thus, dispatch unit 212 of a conventional mapper system can conceivably "dispatch" more instructions than what can actually be retired from unified main mapper 218. The reason for this bottleneck at the unified main mapper 218 is due to the fact that, conventionally, an instruction's mapper entry could not retire from unified main mapper 218 until the instruction "completed" (i.e., all older instructions have "finished" executing).

According to one embodiment, intermediate register mapper 220 serves as a non-timing-critical register for which a "finished", but "incomplete" instruction from unified main mapper 218 could retire to (i.e. removed from unified main mapper 218) in advance of the instruction's eventual completion. Once the instruction "completes", completion unit 240 notifies intermediate register mapper 220 of the completion. The mapper entry in intermediate register mapper 220 can then update the architected coherent state of architected register mapper 216 by replacing the corresponding entry that was presently stored in architected register mapper 216.

When dispatch unit 212 dispatches an instruction, register management unit 214 evaluates the logical register number(s) associated with the instruction against mappings in architected register mapper 216, unified main mapper 218, and intermediate register mapper 220 to determine whether a match (commonly referred to as a "hit") is present in architected register mapper 216, unified main mapper 218, and/or intermediate register mapper 220. This evaluation is referred to as a logical register lookup. When the lookup is performed simultaneously at more than one register mapper (i.e., architected register mapper 216, unified main mapper 218, and/or intermediate register mapper 220), the lookup is referred to as a parallel logical register lookup.

Each instruction that updates the value of a certain target logical register is allocated a new physical register. Whenever this new instance of the logical register is used as a source by any other instruction, the same physical register must be used. As there may exist a multitude of instances of one logical register, there may also exist a multitude of physical registers corresponding to the logical register. Register management unit 214 performs the tasks of (i) analyzing which physical register corresponds to a logical register used by a certain instruction, (ii) replacing the reference to the logical register with a reference to the appropriate physical register (i.e. register renaming), and (iii) allocating a new physical register whenever a new instance of any logical register is created (i.e., physical register allocation).

Initially, before any instructions are dispatched, the unified main mapper 218 will not receive a hit/match since there are no instructions currently in flight. In such an event, unified main mapper 218 creates a mapping entry. As subsequent instructions are dispatched, if a logical register match for the same logical register number is found in both architected register mapper 216 and unified main mapper 218, priority is given to selecting the logical-to-physical register mapping of unified main mapper 218 since the possibility exists that there may be instructions currently executing OoO (i.e., the mapping is in a transient state).

After unified main mapper 218 finds a hit/match within its mapper, the instruction passes to issue queue 222 to await issuance for execution by one of execution units 230. After general execution engine 224 executes and "finishes" the instruction, but before the instruction "completes", register management unit 214 retires the mapping entry presently found in unified main mapper 218 from unified main mapper 218 and moves the mapping entry to intermediate register mapper 220. As a result, a slot in unified main mapper 218 is made available for mapping a subsequently dispatched instruction. Unlike unified main mapper 218, intermediate register mapper 220 does not store dependency data. Thus, the mapping that is transferred to intermediate register mapper 220 does not depend (and does not track) the queue positions of the instructions associated with its source mappings. This is because issue queue 222 retires the "finished, but not completed" instruction is after a successful execution. In contrast, under conventional rename mapping schemes lacking an intermediate register mapper, a unified main mapper continues to store the source rename entry until the instruction completes. Under the present embodiment, intermediate register mapper 220 can be positioned further away from other critical path elements because, unified main mapper 218, its operation is not timing critical.

Once unified main mapper 218 retires a mapping entry from unified main mapper 218 and moves to intermediate register mapper 220, mapper cluster 214 performs a parallel logical register lookup on a subsequently dispatched instruction to determine if the subsequent instruction contains a hit/match in any of architected register mapper 216, unified main mapper 218, and intermediate register mapper 220. If a hit/match to the same destination logical register number is found in at least two of architected register mapper 216, unified main mapper 218, and intermediate register mapper 220, multiplexer 223 in issue queue 222 awards priority by selecting the logical-to-physical register mapping of unified main mapper 218 over that of the intermediate register mapper 220, which in turn, has selection priority over architected register mapper 216.

The mechanism suggested by Barrick by which the selection priority is determined is discussed as follows. A high level logical flowchart of an exemplary method of determining which mapping data values to use in executing an instruction, in accordance with one embodiment. In an embodiment, a dispatch unit 212 dispatching one or more instructions to register management unit 214. In response to the dispatching of the instruction(s), register management unit 214 determines via a parallel logical register lookup whether a "hit" to a logical register (in addition to a "hit" to architected register mapper 216) associated with each dispatched instruction has occurred. In this regard, it should be understood that architected register mapper 216 is assumed to always have hit/match, since architected register mapper 216 stores the checkpointed state of the logical-to-physical register mapper data. If register management unit 214 does not detect a match/hit in unified main mapper 218 and/or intermediate register mapper 220, multiplexer 223 selects the logical-to-physical register renaming data from architected register mapper 216. If register management unit 214 detects a match/hit in unified main mapper 218 and/or intermediate register mapper 220, register management unit 214 determines in a decision block whether a match/hit occurs in both unified main mapper 218 and intermediate register mapper 220. If a hit/match is determined in both mappers 218 and 220, a register management unit 214 determines whether the mapping entry in unified main mapper 218 is "younger" (i.e., the creation of the mapping entry is more recent) than the mapping entry in intermediate register mapper 220. If entry in unified main mapper 218 is younger than the entry in intermediate register mapper 220, multiplexer 223 selects the logical-to-physical register renaming data from unified main mapper 218. If the entry in unified main mapper 218 is not younger than the entry in intermediate register mapper 220, multiplexer 223 selects the logical-to-physical register renaming data from intermediate register mapper 220.

If a match/hit does not occur in both unified main mapper 218 and intermediate register mapper 220, it is determined whether an exclusive hit/match to unified main mapper 218 occurs. If an exclusive hit to unified main mapper 218 occurs, multiplexer 223 selects the logical-to-physical register renaming data from unified main mapper 218. However, if a hit/match does not occur at unified main mapper 218 (thus, the hit/match exclusively occurs at intermediate register mapper 220), multiplexer 223 selects the logical-to-physical register renaming data from intermediate register mapper 220 (block 320). A general execution engine 224 uses the output data of the logical register lookup for execution.

In an example embodiment a dispatch unit 212 dispatches one or more instructions to register management unit 214. A unified main mapper creates a new, logical-to-physical register mapping entry. Issue queue 222 maintains the issue queue position data of the dispatched instruction, which utilizes the mapping entry that is selected via the logical register lookup (described in FIG. 3). General execution engine 224 detects whether any of the instructions under execution has finished (i.e., one of Us 130 has finished execution of an instruction).

If the issued instruction has not finished, the method waits for an instruction to finish. In response to general execution engine 224 detecting that an instruction is finished, unified main mapper 218 moves the logical-to-physical register renaming data from unified main mapper 218 to intermediate register mapper 220. Unified main mapper 218 retires the unified main mapping entry associated with the finished instruction. A completion unit 240 determines whether the finished instruction has completed. If the finished instruction has not completed, completion unit 240 continues to wait until it detects that general execution unit 224 has finished all older instructions. However, if completion unit 240 detects that the finished instruction has completed, intermediate register mapper 220 updates the architected coherent state of architected register mapper 216 and the intermediate register mapper 220 retires its mapping entry.

U.S. Pat. No. 6,189,088 "Forwarding stored data fetched for out-of-order load/read operation to over-taken operation read-accessing same memory location" to Gschwind, filed Feb. 13, 2001 and incorporated herein by reference describes an example out-of-order (OoO) processor.

Figure 3:
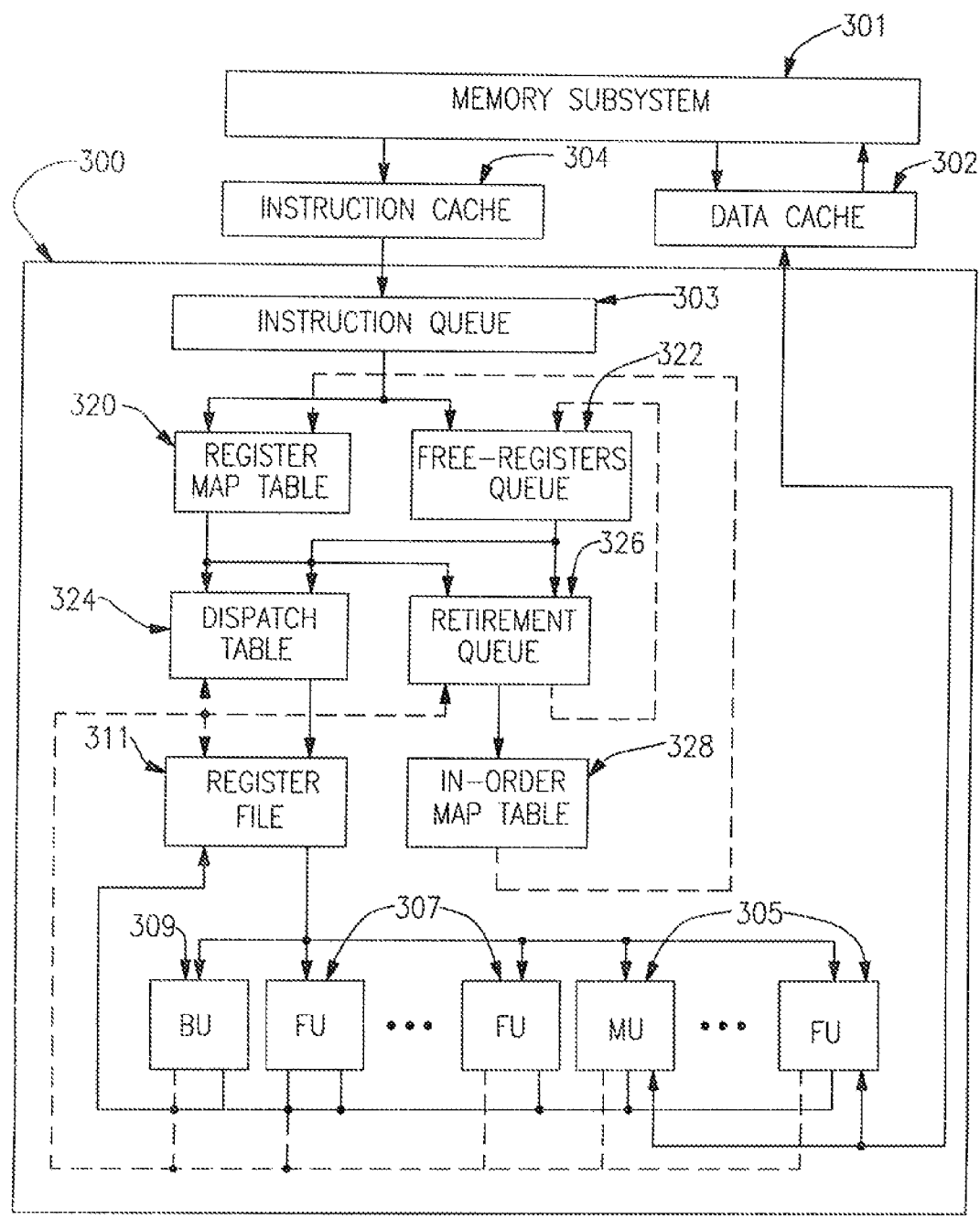
FIG. 3 depicts a second example processor pipeline.

According to Gschwind, FIG. 3 is a functional block diagram of a conventional computer processing system (e.g., including a superscalar processor) that supports dynamic reordering of memory operations and hardware-based implementations of the interference test and data bypass sequence. That is, the system of FIG. 3 includes the hardware resources necessary to support reordering of instructions using the mechanisms listed above, but does not include the hardware resources necessary to support the execution of out-of-order load operations before in-order load operations. The system consists of: a memory subsystem 301; a data cache 302: an instruction cache 304; and a processor unit 300. The processor unit 500 includes: an instruction queue 303; several memory units (MUs) 305 for performing load and store operations; several functional units (FUs) 307 for performing integer, logic and floating-point operations; a branch unit (BU) 309; a register file 311; a register map table 320; a free-registers queue 322; a dispatch table 324; a retirement queue 326; and an in-order map table 328.

In the processor depicted in FIG. 3, instructions are fetched from instruction cache 304 (or from memory subsystem 301, when the instructions are not in instruction cache 304) under the control of branch unit 309, placed in instruction queue 303, and subsequently dispatched from instruction queue 303. The register names used by the instructions for specifying operands are renamed according to the contents of register map table 320, which specifies the current mapping from architected register names to physical registers. The architected register names used by the instructions for specifying the destinations for the results are assigned physical registers extracted from free-registers queue 322, which contains the names of physical registers not currently being used by the processor. The register map table 320 is updated with the assignments of physical registers to the architected destination register names specified by the instructions. Instructions with all their registers renamed are placed in dispatch table 324. Instructions are also placed in retirement queue 326, in program order, including their addresses, and their physical and architected register names. Instructions are dispatched from dispatch table 324 when all the resources to be used by such instructions are available (physical registers have been assigned the expected operands, and functional units are free). The operands used by the instruction are read from register file 311, which typically includes general-purpose registers (GPRs), floating-point registers (FPRs), and condition registers (CRs). Instructions are executed, potentially out-of-order, in a corresponding memory unit 305, functional unit 307 or branch unit 309. Upon completion of execution, the results from the instructions are placed in register file 311. Instructions in dispatch table 324 waiting for the physical registers set by the instructions completing execution are notified. The retirement queue 326 is notified of the instructions completing execution, including whether they raised any exceptions. Completed instructions are removed from retirement queue 326, in program order (from the head of the queue). At retirement time, if no exceptions were raised by an instruction, then in-order map table 328 is updated so that architected register names point to the physical registers in register file 311 containing the results from the instruction being retired: the previous register names from in-order map table 328 are returned to free-registers queue 322.

On the other hand, if an instruction has raised an exception, then program control is set to the address of the instruction being retired from retirement queue 326. Moreover, retirement queue 326 is cleared (flushed), thus canceling all unretired instructions. Further, the register map table 320 is set to the contents of in-order map table 328, and any register not in in-order map table 328 is added to free-registers queue 322.

A conventional superscalar processor that supports reordering of load instructions with respect to preceding load instructions (as shown in FIG. 3) may be augmented with the following:

1. A mechanism for marking load instructions which are issued out-of-order with respect to preceding load instructions;
2. A mechanism to number instructions as they are fetched, and determine whether an instruction occurred earlier or later in the instruction stream. An alternative mechanism may be substituted to determine whether an instruction occurred earlier or later with respect to another instruction;
3. A mechanism to store information about load operations which have been executed out-of-order, including their address in the program order, the address of their access, and the datum value read for the largest guaranteed atomic unit containing the loaded datum:
4. A mechanism for performing an interference test when a load instruction is executed in-order with respect to one or more out-of-order load instructions, and for performing priority encoding when multiple instructions interfere with a load operation;
5. A mechanism for bypassing the datum associated with an interfering load operation: and
6. A mechanism for deleting the record generated in step (3) at the point where the out-of-order state is retired from retirement queue 326 to register file 311 in program order.

The mechanisms disclosed by Gschwind are used in conjunction with the mechanisms available in the conventional out-of-order processor depicted in FIG. 3, as follows. Each instruction is numbered with an instruction number as it enters instruction queue 303. A load instruction may be dispatched from dispatch table 324 earlier than a preceding load instruction. Such a load instruction is denoted below as an 'out-of-order' load operation. In such a case, the entry in retirement queue 326 corresponding to the load instruction is marked as an out-of-order load.

The detection of the dispatching of an out-of-order load operation from dispatch table 324 to a memory unit 305 for execution is preferably accomplished with two counters, a "loads-fetched counter" and a "loads-dispatched counter". The loads-fetched counter is incremented when a load operation is added to dispatch table 324. The loads-dispatched counter is incremented when a load operation is sent to a memory unit 305 for execution. The current contents of the loads-fetched counter is attached to a load instruction when the load instruction is added to dispatch table 324. When the load instruction is dispatched from dispatch table 324 to a memory unit 305 for execution, if the value attached to the load instruction in dispatch table 324 is different from the contents of the loads-dispatched counter at that time, then the load instruction is identified as an out-of-order load operation. Note that the difference among the two counter values corresponds to the exact number of load operations with respect to which load instruction is being issued out-of-order. Out-of-order load instructions are only dispatched to a memory unit 305 if space for adding entries in load-order table is available.

The load-order table is a single table which is accessed by all memory units 305 simultaneously (i.e., only a single logical copy is maintained, although multiple physical copies may be maintained to speed up processing). Note that if multiple physical copies are used, then the logical contents of the multiple copies must always reflect the same state to all memory units 305.

The instruction number of the instruction being executed and the fact of whether an instruction is executed speculatively is communicated to memory unit 305 for each load operation issued.

An instruction set architecture (ISA), implemented by a processor, typically defines a fixed number of architected general purpose registers that are accessible, based on register fields of instructions of the ISA. In out-of-order execution processors, rename registers are assigned to hold register results of speculatively executed of instructions. The value of the rename register is committed as an architected register value, when the corresponding speculative instruction execution is "committed" or "completed. Thus, at any one point in time, and as observed by a program executing on the processor, in a register rename embodiment, there exist many more rename registers than architected registers.

In one embodiment of rename registers, separate registers are assigned to architected registers and rename registers. In another, embodiment, rename registers and architected registers are merged registers. The merged registers include a tag for indicating the state of the merged register, wherein in one state, the merged register is a rename register and in another state, the merged register is an architected register.

In a merged register embodiment, as part of the initialization (for example, during a context switch, or when initializing a partition), the first n physical registers are assigned as the architectural registers, where n is the number of the registers declared by the instruction set architecture (ISA). These registers are set to be in the architectural register (AR) state; the remaining physical registers take on the available state. When an issued instruction includes a destination register, a new rename buffer is needed. For this reason, one physical register is selected from the pool of the available registers and allocated to the destination register. Accordingly, the selected register state is set to the rename buffer not-valid state (NV), and its valid bit is reset. After the associated instruction finishes execution, the produced result is written into the selected register, its valid bit is set, and its state changes to rename buffer (RB), valid. Later, when the associated instruction completes, the allocated rename buffer will be declared to be the architectural register that implements the destination register specified in the just completed instruction. Its state then changes to the architectural register state (AR) to reflect this.

While registers are almost a universal solution to performance, they do have a drawback. Different parts of a computer program all use their own temporary values, and therefore compete for the use of the registers. Since a good understanding of the nature of program flow at runtime is very difficult, there is no easy way for the developer to know in advance how many registers they should use, and how many to leave aside for other parts of the program. In general these sorts of considerations are ignored, and the developers, and more likely, the compilers they use, attempt to use all the registers visible to them. In the case of processors with very few registers to begin with, this is also the only reasonable course of action.

Register windows aim to solve this issue. Since every part of a program wants registers for its own use, several sets of registers are provided for the different parts of the program. If these registers were visible, there would be more registers to compete over, i.e. they have to be made invisible.

Rendering the registers invisible can be implemented efficiently; the CPU recognizes the movement from one part of the program to another during a procedure call. It is accomplished by one of a small number of instructions (prologue) and ends with one of a similarly small set (epilogue). In the Berkeley design, these calls would cause a new set of registers to be "swapped in" at that point, or marked as "dead" (or "reusable") when the call ends.

Processors such as PowerPC save state to predefined and reserved machine registers. When an exception happens while the processor is already using the contents of the current window to process another exception, the processor will generate a double fault in this very situation.

In an example RISC embodiment, only eight registers out of a total of 64 are visible to the programs. The complete set of registers are known as the register file, and any particular set of eight as a window. The file allows up to eight procedure calls to have their own register sets. As long as the program does not call down chains longer than eight calls deep, the registers never have to be spilled. i.e. saved out to main memory or cache which is a slow process compared to register access. For many programs a chain of six is as deep as the program will go.

By comparison, another architecture provides simultaneous visibility into four sets of eight registers each. Three sets of eight registers each are "windowed". Eight registers (i0 through i7) form the input registers to the current procedure level. Eight registers (L0 through L7) are local to the current procedure level, and eight registers (o0 through o7) are the outputs from the current procedure level to the next level called. When a procedure is called, the register window shifts by sixteen registers, hiding the old input registers and old local registers and making the old output registers the new input registers. The common registers (old output registers and new input registers) are used for parameter passing. Finally, eight registers (g0 through g7) are globally visible to all procedure levels.

An improved the design allocates the windows to be of variable size, which helps utilization in the common case where fewer than eight registers are needed for a call. It also separated the registers into a global set of 64, and an additional 128 for the windows.

Register windows also provide an easy upgrade path. Since the additional registers are invisible to the programs, additional windows can be added at any time. For instance, the use of object-oriented programming often results in a greater number of "smaller" calls, which can be accommodated by increasing the windows from eight to sixteen for instance.

The end result is fewer slow register window spill and fill operations because the register windows overflow less often.

Instruction set architecture (ISA) processor out-of-order instruction implementations may execute architected instructions directly or by use of firmware invoked by a hardware instruction decode unit. However, many processors "crack" architected instructions into micro-ops directed to hardware units within the processor. Furthermore, a complex instruction set computer (CISC) architecture processor, may translate CISC instructions into reduced instruction set computer (RISC) architecture instructions. In order to teach aspects of the invention, ISA machine instructions are described, and internal operations (iops) may be deployed internally as the ISA machine instruction, or as smaller units (micro-ops), or microcode or by any means well known in the art, and will still be referred to herein as machine instructions. Machine instructions of an ISA have a format and function as defined by the ISA, once the ISA machine instruction is fetched and decoded, it may be transformed into iops for use within the processor.

A computer processor may comprise an instruction fetching unit for obtaining instructions from main storage, a decode unit for decoding instructions, an issue queue for queuing instructions to be executed, execution units for executing function of instructions and a dispatch unit for dispatching instructions to respective execution units preferably in a pipeline. In embodiments, an issue queue, a decode unit or a dispatch unit, for example, alone or in combination, may modify an instruction such that it does not have to be executed after a previous instruction.

In an embodiment, the processor determines that there is a first instruction and a second instruction, wherein the second instruction is configured to use the results of execution of the first instruction in executing the second instruction. A test of the two instructions determines that they can be modified in order to produce instructions that can be executed more efficiently. In an example, the modification enables the two instructions to be executed out-of-order (the second instruction (second in program order) is not dependent on results of the first instruction (first in program order)).

In an example embodiment, an architected instruction set provides immediate instructions, (immediate instructions have an immediate field sometimes referred to as a displacement field or a constant field, the immediate field providing an immediate value). The immediate instruction may also include a register field, wherein an operand is a register value of a register identified by the register field or wherein an operand is a memory value of a memory location determined by the register value. The immediate instruction further has an opcode field having a value determining an operation to be performed (such as an ADD, SUBTRACT. AND, OR, Load. Store for example). Execution of the immediate instruction performs the operation using the operand value and the immediate value and may store the result in an immediate instruction specified result register (or main storage).

In an example architecture, the instruction set includes immediate instruction, wherein operation is performed on only a portion of the operand. Thus, an immediate value may be added to a low order portion of the operand for example. The instruction set may provide a 16 bit immediate field and a 32 bit register, in which case a constant to be loaded into a 32 bit register would require two immediate instructions. In an example sequence of instructions, a first immediate instruction is used to load the low order portion and a second immediate instruction is used to load the high order portion. In another instruction set, immediate fields may be 8 bits and registers 32 bits, in which case 4 immediate instructions would be needed to load a constant into the register. In some environments, only a portion of the operand may be needed, such as in creating a table address, only the low order portion is provided by an instruction in a sequence of instructions (each sequence of instructions identifying a table entry by using an immediate value to a low order portion of the register, but not effecting the high order portion that locates the table). In that case, only two 8 bit immediate instructions are needed for loading the low order 16 bits of the 32 bit register.

In an example embodiment, two immediate instructions are included in a program, a first immediate instruction is followed in program order by a second immediate instruction. Each instruction includes a 16 bit immediate (or displacement) field (disp) and a target register (RT). The function of the first immediate instruction is to load the value of the first disp field into the low order portion of the first RT. The function of the second immediate instruction is to load the value of the second disp field into the high order portion of the second RT. The processor executing the two instructions determines that the two instructions can be combined, for example in an issue queue of the processor, because the processor has the ability to detect the two instructions and combine the disp fields by concatenating the first disp and the second disp into an internal data value that fits in the pipeline, the first instruction is discarded and a modified second instruction is created having the concatenated value as a disp field. In an embodiment, the internal data value that is supported is narrow so only a portion of the second disp value can be combined, in which case the processor detects only the occurrence of second disp values that are small enough. The immediate instructions having the form:

RT←disp where first instruction: RT←disp(low)

second instruction: RT←disp(high)

modified second instruction: RT←disp(high)//disp(low)

In another embodiment, the first and second instructions further comprise a second register field (RA field) for identifying an operand register (RA).

instruction form RT←RA, disp

A function is performed by each instruction using the operand register RA and the disp field. An occurrence of the two instructions is detected where each instruction is performing the same operation but only on a portion of RA and RT. For example, a Logical AND instruction ANDS the RA value to the disp value:

first instruction: r2←r3, disp(high) [ands disp to the high portion of the value o the r3 register and puts the result in the high portion of the r2 register]

second instruction: r2←r3, disp(low) [ands disp to the low portion of the value of the r3 register and puts the result in the low portion of the R2 register]

modified second instruction: r2←r3, disp(high)//disp(low) [ands disp(high) concatenated with disp(low) to the value of the r3 register and puts the result in the r2 register]

In a variation an arithmetic operation is performed in two instructions in which case the two instructions must be executed in program order since the result of the first instruction is needed in order to execute the second instruction. In this example, an r2 and an r4 result must be stored in the registers. In this case the second instruction is modified in order to create an internal pair of instructions that can be executed out-of-order.

first instruction: r2←r3, disp(high) [adds an 8 bit disp concatenated with 8 low order 0's to the value of the 16 bit r3 register and puts the result in the 16 bit r2 register]

second instruction: r4←r2, disp(low) [adds a sign extended 8 bit disp (16 bits) to the 16 bit r2 register and puts the result in the 16 bit r4 register]

modified second instruction: r4←r3, disp(high)//disp(low) [adds disp(high) concatenated with disp(low) to the value of the r3 register and puts the result in the r4 register]

In an embodiment, a first instruction sequence consisting of at least a first instruction "i0" and a second instruction "i1", and a sequence of multiple internal instructions (internal ops (iops)) that are improvements of the instruction sequence. For example, a producer instruction followed by a consumer instruction in program order (requiring in-order execution) might be optimized to create iop0 corresponding to the producer instruction and iop1 corresponding to the consumer instruction, where iop0 and iop1 can be executed out-of-order.

Figure 4A:
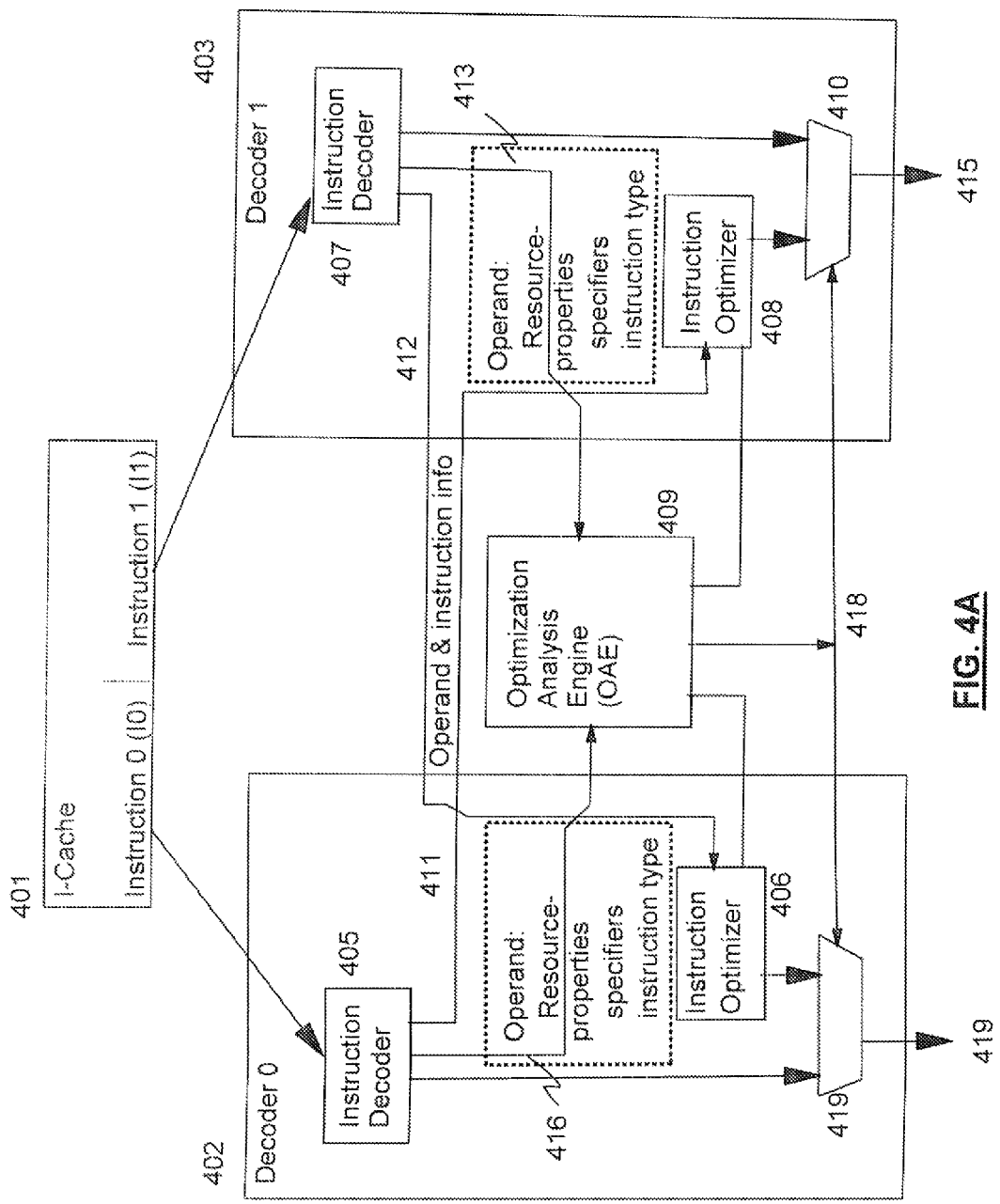
FIG. 4A depicts an example optimization analysis engine environment.

Referring now to FIG. 4A, an exemplary embodiment is shown. A first decoder 0 402 receives from an instruction cache (I-Cache) 401, a first instruction 0 (I0), and a second decoder 1 403 receives a second instruction I1. The decoders 402 403 perform initial decoding 405 407, and provide information 411 412 413 416 about the decoded plurality of instructions (represented by at least an instruction I0 and an instruction I1) to an Optimization analysis engine (OAE) 409. Instruction decode logic in decoders 0 405 and 1 407 also generates an initial decoded iop representation for the first and second instruction corresponding to a first iop (iop0) 414 and second iop (iop1) 415 when no optimization takes place.

In an embodiment, the OAE 409 compares the decoded characteristics of the instructions in example decoders 0 402 and 1 403 to determine whether they correspond to one of a plurality of compound sequences that are candidates for optimization. In accordance with one embodiment, the OAE 409 is also responsive to a plurality of control signals, to suppress the recognition of compound sequences, e.g., when a configuration bit is set. Configuration bits can correspond to implementation specific registers to disable all or a subset of compound instructions to disable decode time instruction optimization (DTIO) when a design error has been detected, when a determination has been made that performing a DTIO sequence is no longer advantageous, when a processor enters single-instruction (tracing) mode, and so forth. The OAE 409 can be a single entity as shown in FIG. 4A, or can be replicated, distributed, split or otherwise integrated in one or more of decoders 0 402 and 1 403, and the OAE 409 can be combined in a single large compound decoder, e.g. including but not limited to a complex decoder comprising the OAE 409, decoder0 402 and decoder1 403 in a single structure, to facilitate logic optimization and circuit design improvements.

The OAE provides information indicating whether a compound sequence which can be optimized has been detected, as well as information about the nature of the sequence (i.e., which of a plurality of instruction, and specific properties of the sequence required by the decoder optimization logic to generate an optimized sequence. OAE also provides steering logic to a selector to select one of an unoptimized iop generated by the initial decode operation, or an iop corresponding to an iop in an optimized DTIO sequence which has been generated by "optimization logic" under control of the OAE control signals, and additional information received from decoders having decoded a portion of a compound sequence being optimized, such as register specifiers, immediate fields and operation codes for example.

OAE 409 may provide selection information 418 to selection logic 419 410 for determining if the respective instructions I0 or I1 should generate respective iop0 414 and iop1 415, or if an optimized instruction should be used.

An embodiment of an OAE 409 process is demonstrated in the following example Psuedo-code:

```
IF (decoder0_addis && decoder1_additive_immed &&
        decoder0_target == decoder1_rs1 &&
        decoder1_displacement_OK &&
        decoder0_rt == decoder1_rt) THEN
    decoder0_subsume <= TRUE;
    decoder1_concat_immed <= TRUE;
ELSIF (decoder0_addis && decoder1_additive_immed &&
        decoder0_target == decoder1_rs1 &&
        decoder1_displacement_OK &&
        decoder0_rt /= decoder1_rt) THEN
    decoder0_subsume <= FALSE;
    decoder1_concat_immed <= TRUE;
ELSIF (decoder0_1i && decoder1_addis &&
        decoder0_target == decoder1_rs1 &&
        decoder1_displacement_OK &&
        decoder0_rt == decoder1_rt) THEN
    decoder0_subsume <= TRUE;
    decoder1_concat_immed <= TRUE;
ELSIF (decoder0_1i && decoder1_addis &&
        decoder0_target == decoder1_rs1 &&
        decoder1_displacement_OK &&
        decoder0_rt /= decoder1_rt) THEN
    decoder0_subsume <= FALSE;
    decoder1_concat_immed <= TRUE;
ELSIF (decoder0_andis && decoder1_and &&
        decoder0_target == decoder1_rs1 &&
        decoder1_displacement_OK &&
        decoder0_rt == decoder1_rt) THEN
    decoder0_subsume <= TRUE;
    decoder1_concat_immed <= TRUE;
ELSIF
```

In an example embodiment based on PowerPC architecture, the following two instructions are candidates for optimization:

first immediate instruction: ADDIS r9 = r2, high_field (disp)

...

second immediate instruction: ADDI r3 = r9, low-field(disp)

Where the first and second immediate instructions have the generic form:
ADDIS (RT)←(RA)+(SIMM//0x0000)
ADDII (RT)←(RA)+(sign extended SIMM)
wherein, the first instruction comprises a first immediate field (disp), a first register field (r2) and a first result register field (r9) and the first instruction is configured to perform an operation (ADDIS) using a value of the first immediate field and the high order portion of a register identified by the first register field and store the result in the first result register specified by the first result register field. The second instruction comprises a second immediate field (disp), a second register field (r9) and a second result register field (r3) and the second instruction is configured to perform an operation using a value of the second immediate field and the low order portion of a register identified by the first register field and store the result in the second result register specified by the second result register field. An example, an ADDIS instruction is the first instruction and an ADDI instruction is the second instruction. (These two instructions are used as examples to teach aspects of the invention but the invention is not limited to these instructions). Of course, there may be other intervening instructions between the first immediate instruction and the second immediate instruction in some environments.

ADDIS concatenates a 16 bit immediate field value as a high order 16 bits to 16 low order 0's and arithmetically adds the concatenated sign extended 32 bit value to an operand located at an instruction specified RA register address. The result is stored in an instruction specified RT result register (r9). (it should be noted, in the PowerPC ISA, if the RA field specifies register 0.32 or 64 0's are added to the concatenated 32 bit value).

ADDI concatenates sign-extends a 16 bit immediate field value and arithmetically adds the sign-extended value to an operand located at an instruction specified RA register address. The result is stored in an instruction specified RT result register (r9). (it should be noted, in the PowerPC ISA, if the RA field specifies register 0, 32 or 64 0's are added to the concatenated 32 bit value).

The Load Immediate (LI) instruction (the PowerPC li instruction is a form of the addi instruction where A=0) stores a sign extended low order 16 bit immediate value in a target register (rD).

```
addi                                                          addi
Add Immediate (x'3800 0000')

addi            rD,rA,SIMM
```

| 14 | D | A | SIMM |
|---|---|---|---|
| 0 | 5  6 | 10  11 | 15  16      31 | if rA = 0
    then rD ← EXTS (SIMM)
    else rD ← (rA) + EXTS (SIMM)

The sum (rA|0) + sign extended SIMM is placed into rD.
The addi instruction is preferred for addition because it sets few status bits.
NOTE: addi uses the value 0, not the contents of GPR0, if rA = 0.

Other Registers Altered:
  None
Simplified Mnemonics:

| li | rD,value | equivalent to | addi | rD,0,value |
|---|---|---|---|---|
| la | rD,disp(rA) | equivalent to | addi | rD,rA,disp |
| subi | rD,rA,value | equivalent to | addi | rD,rA,-value |

Add Immediate Shifted                                                    D-form addis   RT,RA,SI

| 15 | RT | RA | SI |
|---|---|---|---|
| 0 | 6 | 11 | 16    31 | if RA = 0 then RT ← EXTS (SI || $^{16}$0)
else        RT ← (RA) + EXTS (SI || $^{16}$0)

The sum (RA|0)+(SI||0x0000) is placed into register RT.
Special Registers Altered:
  None
Extended Mnemonics:
Examples of extended mnemonics for Add Immediate Shifted:

| | Extended: | | Equivalent to: |
|---|---|---|---|
| lis | Rx,value | addis | Rx,0,value |
| subis | Rx,Ry,value | addis | Rx,Ry,-value |

The second instruction can be modified to include the first immediate field and the second immediate field (by concatenating all or part of the first immediate field with the second immediate field) and specify the second register specified by the r2 field (rather than the first register specified by the r9 field) so the resulting modified second instruction can be executed out-of-order with respect to the execution of the first instruction:

first immediate instruction: ADDIS r9=r2, high_field (disp)
modified second immediate instruction: ADI r3=r2, high_field//low-field(disp)

In an embodiment wherein only a portion of the immediate fields can be concatenated due to pipeline restrictions, a detector circuit determines that the first immediate field has a predetermined number of high order '0's and concatenates only a portion of the first immediate field with the second immediate field to form the modified instruction. If the first instruction has less high order '0's it is executed in order without modification. In an alternate embodiment, a detector circuit can detect that the first immediate field has a predetermined number of high order '0's or '1's and concatenates only a portion of the first immediate field with the second immediate field to form the modified instruction.

In another example embodiment,
ADDIS r9=r2, low_field (disp)
ADDI r3=r9, high-field(disp)
the first instruction comprises a first immediate field (low-field (disp)) and the second instruction comprises a second immediate field (high-field (disp)) in which case, the second instruction may be modified similarly to the previous example by replacing the second register field with the first register field and, in concatenating all or a portion of the first immediate field (a low-field(disp) as a low order value with the second immediate field (a high-field(disp)) as a high order value.

first immediate instruction: ADDIS r9=r2, low_field (disp)
modified second immediate instruction (ADDI→ADDIM): ADDIM r3=r2, high_field (disp)// low-field (disp)

In an embodiment, a processor and a compiler cooperate to facilitate the function. The compiler developers identify combinations of first and second immediate instructions for compiled programs that would be suited for aspects of the invention. The processor is designed specifically to detect an occurrence of the first and second immediate instructions in an instruction stream and to modify the second immediate instructions according to a predefined criteria. The compiler, compiles code using instructions that will trigger the modified second immediate instructions accordingly.

In the previous example, the predefined criteria may be an ADDIS instruction (ADDIS opcode) followed by a ADDI instruction (ADDI opcode) wherein the RT (result register) field of the ADDIS is the same as the RA field of the ADDD instruction. In another embodiment, the order could be generalized wherein the preferred criteria is an ADDIS instruction (ADDIS opcode) in combination with a ADDI instruction (ADDI opcode, and including the special case of LI operation of the ADDI wherein RA=0) wherein the RT (result register) field of the first is the same as the RA field of the second instruction.

In an embodiment, the engine is configured to detect a plurality of patterns, and generate control signals. Example Analysis optimization engine Pseudo-code are as follows:

```
IF (decoder0_addis && decoder1_additive_immed &&      /*1st Clause*/
    decoder0_target == decoder1_rs1 &&
    decoder1_displacement_OK &&
    decoder0_rt == decoder1_rt)
    THEN:
      decoder0_subsume <= TRUE;
      decoder1_concat_immed <= TRUE;
ELSE;
IF (decoder0_addis && decoder1_additive_immed &&      /*2nd Clause*/
    decoder0_target == decoder1_rs1 &&
    decoder1_displacement_OK &&
    decoder0_rt /= decoder1_rt)
    THEN
      decoder0_subsume <= FALSE;
      decoder1_concat_immed <= TRUE;
ELSE;
IF (decoder0_li && decoder1_addis &&                  /*3rd Clause*/
    decoder0_target == decoder1_rs1 &&
    decoder1_ displacement_OK &&
    decoder0_rt == decoder1_rt)
    THEN
      decoder0_subsume <= TRUE;
      decoder1_concat_immed <= TRUE;
ELSE;
IF (decoder0_li && decoder1_addis &&                  /*4th Clause*/
    decoder0_target == decoder1_rs1 &&
    decoder1_displacement_OK &&
    decoder0_rt /= decoder1_rt)
    THEN
      decoder0_subsume <= FALSE;
      decoder1_concat_immed <= TRUE;
ELSE
IF (decoder0_andis && decoder1_and &&                 /*5th Clause*/
    decoder0_target == decoder1_rs1 &&
    decoder1_displacement_OK &&
    decoder0_rt == decoder1_rt)
      THEN
        decoder0_subsume <= TRUE;
        decoder1_concat_immed <= TRUE;
```

The example function is as follows.
1st IF CLAUSE
x1 "addis rD1, rA1, SIMM(1)"
x2 "addi rD2, rA2, SIMM(2)"
any addis (x1) followed by certain additive instructions targeting a GPR (x2) (such as D-Form PowerPC instructions), wherein the target register of the addis is the same as a base register of the source (rD1 is the same register as rA2), that is not a store (i.e., addi instructions and loads, and where the displacement value in decoder0 meets a criterion expressed as displacement_OK (e.g., a limit the number of bits) will generate control signals to indicate that a DTIO optimization has been detected (select_DTIO), a signal preferably connected to selection logic of FIG. 4A that will:
  a) indicate the specific compound sequence (DTICO_SEQ_no) which will be used by optimization logic to generate modified signals
  b) generate a control signal indicating whether the iop in decoder0 should be emitted or replaced by a NOP (decoder0_subsume) and whether decoder1 should combine the displacement from decoder0 with its own displacement. (In an embodiment, the 1st clause checks for rD1 and rD2 specifying the same register, in which case the first instruction (x1) is discarded or replaced by a no-op.
2nd IF Clause
x1 "addis rD1, rA1, SIMM(1)"
x2 "addi rD2, rA2, SIMM(2)"
any addis (x1) followed by an additive certain instruction targeting a GPR (such as D-Form PowerPC instructions) (x2), wherein the target register of the addis is the same as the base register of the source (rD1 is the same register as rA2), and where the displacement value (SIMM(1)//0x0000) in decoder0 meets a criterion expressed as displacement_OK (e.g., a limit on the number of bits supported by iops of the processor)
This will generate control signals to:
  a) indicate that a DTIO optimization has been detected (select_DTIO), a signal preferably connected to selection logic of FIG. 4A;
  b) indicate the specific compound sequence (DTIO_SEQ_no) which will be used by optimization logic to generate modified signals
  c) generate a control signal indicating whether the iop in decoder0 should be emitted or replaced by a NOP (no-ope) (decoder0_subsume) and
  d) indicate whether decoder1 should combine the displacement (SIMM) from decoder0 with its own displacement (SIMM)
3rd IF Clause
x1 "addi rD1, rA1, SIMM(1)"
x2 "addis rD2, rA2, SIMM(2)"
any load immediate (which is really an addi to register 0) followed by an addis, where the displacement (immediate value (SIMM(1)//0x0000)) on addis in decoder 1 meets the displacement criterion for merging displacements, where the target of the load immediate (rD1) is the same register as the target (rD2) and source (rA2) of the addis
This will generate control signals to:
  a) indicate that a DTIO optimization has been detected (select_DTIO), a signal preferably connected to selection logic of FIG. 4A;
  b) indicate the specific compound sequence (DTIO_SEQ_no) which will be used by optimization logic to generate modified signals
  c) generate a control signal indicating whether the iop in decoder1 should be emitted or replaced by a NOP (decoder1_subsume) and whether decoder0 should combine the displacement from decoder1 with its own displacement
4th IF Clause
x1 "addi rD1, rA1, SIMM(1)"
x2 "addis rD2, rA2, SIMM(2)"
any load immediate (x1) (which is really an addi to register 0) followed by an addis, where the displacement (immediate value (SIMM//0x0000)) on addis in decoder 1 meets the displacement criterion for merging displacements, where the target of the load immediate is NOT the same register as the target of the addis (rD2 not the same register as rD1), but is the same as the source of addis (rD2 is the same register as rA2)
This will generate control signals to:
  a) indicate that a DTIO optimization has been detected (select_D TO), a signal preferably connected to selection logic of FIG. 4A;
  b) indicate the specific compound sequence (DTIO_SEQ_no) which will be used by optimization logic to generate modified signals
  c) generate a control signal indicating whether the iop in decoder0 or decoder1 should be emitted or replaced by a NOP (decoder0_subsume, decoder1_subsume)
  and
  d) indicate whether decoder0 should combine the displacement from decoder1 with its own displacement by prepending its own displacement to decoder0's displacement (decoder1_mmed_merged0d1)
5th IF Clause:
detects a combination of an andis ("addis rDa, rAa, SIMM (a)") and an andi ("addi rDb, rAb, SIMM(b)") instruction, where the target of andis (rDa) is the same as the source and target of andi (rDb rAb).

While PowerPC instructions is used to demonstrate aspects of the invention, the invention could be advantageously practiced by other PowerPC instructions as well as any ISA, including, but not limited to Intel® x86 ISA for example.

It should be noted that in the PowerPC examples above, concatenation of two SIMM immediate values in PowerPC iop can be performed when the low-order SIMM is positive (high order bit=-0). However, for the case where the low-order SIMM is negative (sign extended), an effective ADD operation of the sign bits with the high order value is needed. This can be done at any stage in the pipeline, as long as the pipeline understands that a bit of the concatenated value should be treated as a sign bit which must be effectively propagated and added to a high order portion of an immediate constant. In an embodiment, only positive values are optimized. In another embodiment, the concatenation is performed and the pipeline is informed that the concatenated value includes an embedded sign bit, for example by providing a tag to the instruction that is passed in the pipeline. In an embodiment, the concatenated value is manipulated by the execution unit to effectively handle the sign bit which manipulation effectively subtracts a 1 (adds all 0's) to the high order portion of the concatenated value. In an embodiment, an arithmetic operation is performed on the high-order bits based on the sign bit in the decode unit to produce a corrected value in the optimized iop. In an embodiment, the decode unit creates an iop immediate field representing the combined low order value and high order value.

Although an ADD operation has been used to teach aspects of the invention, one skilled in the art will appreciate that the invention can be practiced with a variety of instructions having other than ADD operations, including logical operations (AND, OR, XOR for example) or other arithmetic operations and the like.

Accordingly, PowerPC offers other immediate instructions that would similarly lend themselves to be optimized using aspects of the invention. Fore example, the "OR Immediate" (ORI) and "OR Immediate Shifted" (ORIS) instructions as follows OR Immediate                                    D-form ori    RA,RS,UI

| 24 | RS | RA | UI |
|---|---|---|---|
| 0 | 6 | 11 | 16    31 |

RA ← (RS) | ($^{48}$0 || UI)

The contents of register RS are ORed with $^{48}$0||UI and the result is placed into register RA.

The preferred "no-op" (an instruction that does nothing) is:
ori 0,0,0
Special Registers Altered:
None OR Immediate Shifted                            D-form oris   RA,RS,UI

| 25 | RS | RA | UI |
|---|---|---|---|
| 0 | 6 | 11 | 16    31 |

RA ← (RS) | ($^{32}$0 || UI || $^{16}$0)

The contents of register RS are ORed with $^{32}$0||UI||$^{16}$0 and the result is placed into register RA.

Special Registers Altered:
None oris RA←(RS)|(0x00000000/UI//0x0000)

Performs a logical OR "I" operation of the immediate field (UI) with the high order 16 bits of the low order 32 bits of the 64 bit RS operand.

and ori RA←(RS)|(0x000000000000//UI)

performs a logical OR operation of the immediate field (UI) with the low order 16 bits of the 64 bit RS operand.

In an embodiment (with reference to the z/Architecture ISA), dependent instructions having register dependencies can be made independent. For example, 2 sequential instructions wherein the first instruction in program order stores to a target register (RT) and a next instruction uses the same register as a source register (RS). Thus, the instruction sequence
  AGRK r5←r3 ADD r4
  AGRK r6←r5 ADD r2
can be implemented by modifying the second instruction as shown:
  AGRK r5←r3 ADD r4
  LAM r6←r2 ADD r3 ADD r4 iop
where the LAM instruction is an iop instruction that adds content of 3 registers RA, RB and RC and stores the result in a register RT.

AGRK        R$_1$,R$_2$,R$_3$                              [RRF-a]

For ADD (A, AG, AGF, AGFR, AGR, AR, and AY) and for ADD IMMEDIATE (AFI, AGFI, AGSI, and ASI), the second operand is added to the first operand, and the sum is placed at the first-operand location. For ADD (AGRK and ARK) and for ADD IMMEDIATE (AGHIK and AHIK), the second operand is added to the third operand, and the sum is placed at the first operand location.

Also, in another embodiment
  AGRK r5←r3 ADD r4
  AGHIK r6←r5 ADD displacement
can be implemented by modifying the second instruction as shown
  AGRK r5←r3 ADD r4
  LA r6←disp ADD r3 ADD r4
where the LA instruction is an IOP instruction that adds 2 registers and a displacement value.

AGHIK       R$_1$,R$_3$,I$_2$                             [RIE-d]

For ADD IMMEDIATE (AGHIK and AHIK), the second operand (immediate field I2) is added to the third operand (R3), and the sum is placed at the first operand (R1) location. For ADD IMMEDIATE (AGHIK), the first and third operands are treated as 64-bit signed binary integers, and the second operand is treated as a 16-bit signed binary integer.

Those skilled in the art will appreciate that while the exemplary embodiments have been directed towards the detection of two-instruction sequences, and OAE may be connected to more than two decoders, and identify DTIO sequences consisting of more than 2 instructions. Furthermore the DTIO sequence of instructions may be separated by additional instructions in an embodiment.

Instructions in an instruction set architecture (ISA) are typically defined in a modular fashion, with basic function blocks represented by an individual instruction. In certain cases, specific instruction sequences can be optimized to execute more efficiently with an alternate sequence of instructions that may not be available to the ISA. Also, ISAs ability to add new instructions are limited by the available opcode space. This is particularly severe for RISC architectures with fixed width instruction sets, such as SPARC, ARM or PowerPC. In many instances, modern microarchitectures can integrate more function than defined in either RISC or CISC instructions. Frequently, instructions computing a value can be combined with a successor instruction, consuming that value into a single more complex instruction (fusion). However, since the executing processor has no way of knowing whether a result is an intermediate result or whether it will be used again, the first instruction computing the intermediate result must usually be retained in order to preserve architectural equivalence.

In an embodiment, an instruction set is proposed that contains "last-use" information indicating when a value is used for the last time. In the past, when a processor (for example instruction decode logic) recognizes a sequence has been fetched for execution that is capable of being optimized, any store operations performed by the sequence must be done in the optimized version to comply with the architected function of the sequence of instructions. Thus, a compound-iop (internal operation or internal instruction) can be generated to perform the combined operation of two or more instructions, that typically have a produce-consumer relationship via a register written by at least a first instruction and read at least by a second instruction. Even when the processor instruction optimizer generates a compound-iop performing the combined function of both operations, the processor instruction optimizer must generate an iop to compute the output of the first instruction and store it in the architected register that joins producer/consumer of the optimized instruction sequence, in case any future use of the value occurs. In many cases the value in the producer/consumer relationship is used only once, and then is not further references. Aspects of the present invention, exploit indications that the register in the producer/consumer dependence has a last-use in the consumer of the optimized sequence without storing the intermediate value.

In an embodiment, a microprocessor equipped to decode candidate instructions containing last-use information contains instruction optimization logic, the instruction optimization logic is preferably configured to:
  detect instruction sequences that can be optimized;
  detect that one or more results of the detected sequence to be stored in an architected resource are indicated to have a last-use within the optimized instruction sequence; and
  generate an optimized instruction (or iop) sequence wherein intermediate results designated as last-use are not stored.

In an embodiment, pairs of candidate instructions are detected at decode time by processor logic, however other embodiments are also possible within the scope of the present invention.

In an embodiment, referring to FIG. 4, each of the pair of candidate instructions I0, I1 401 have an immediate field. Instruction Decoders 405 407 pass immediate fields and information about the instructions they are decoding to the other decoder 407 405. With the information about the other instructions, the OAE 409 in combination with optimization logic 406 408 of each decoder, can cause the immediate fields to be concatenated in a new instruction. The new instruction replaces one (or both) of the candidate instructions, and passes the concatenated field to the execution unit to be executed out-of-order.

In an embodiment, one of the immediate fields is a sign extended negative value, in which case the new instruction is tagged to indicate the high order portion of the concatenated value must be decremented by 1 at some point in the pipeline in order to use the concatenated immediate value.

In an embodiment, the pair of candidate instructions have a common register (preferably, a target register of a producer instruction that is followed by a consumer instruction having the same architected register as a source register). The OAE 409 in combination with the optimization logic 406 408 cause a new instruction to replace one of the candidate instructions in the pipeline, where the new instruction employs registers of both candidate instructions in a single new instruction (iop). In an embodiment the producer-consumer dependency is eliminated by producing one or two optimized instructions from the pair of instructions, wherein the produced instructions can be executed out of order, wherein the consumer instruction indicates a last-use of the register value such that for the resulting instruction(s), need not save the consumed register value.

In an embodiment, a prefix instruction I0 specifies a register is a last-use register in another instruction I1 by passing last-use information between decoder 0 402 and decoder 1 403. In another embodiment, an instruction I1 includes last-use information.

In an embodiment, last use information is determined in an instruction decoder 402 403 and decoded instructions 414 415 are tagged with last use indicators to be handled later in the pipeline, preferably by rename logic associated with completion logic.

Previously, when a producer and consumer instruction were optimized, the register value passed from the producer to the consumer would have to have been saved in order to conform to the architecture. In an aspect of the present invention, a last-use indicator provides the processor with the knowledge that the register value will not be used again subsequent to the use by the consumer instruction. This knowledge enables the processor optimization logic to produce optimized instructions that are faster and reduce resource contention by not saving the register value.

Generating Optimized Groups of Multiple Decoded Instructions that can be Executed Out-of-Order:

The instruction sequence
  mflr r4 - - -
  std r4, r2, 45 - - -
where the "mflr" instruction moves an operand from a special purpose register (SPR) to R4 register, and the "std" instruction adds an immediate field value (45) to R2 to form an effective address (EA) of main storage and the operand at RT (r4) is stored in memory at a location specified by EA. These two instructions can be optimized as follows
  mtlr r4
  stspr lr, r2, 45
wherein stspr is a newly introduced instruction to store SPRs directly to memory. This makes "stspr lr, r2, 45" independent of the prior mflr instruction and ready to issue immediately.

In an embodiment optimized for instruction issue, the sequence is generated as stspr lr, r2, 45
    mflr r4 making the presumably more critical instruction eligible to issue prior to the mflr instruction, under the assumption that the value in r4 will no longer be used. Note however, that mflr is necessary to preserve the specified semantics in accordance with the instruction set architecture (ISA).

PowerPC for example, provides instructions used in the examples:

mfspr
Move from Special-Purpose Register (x'7C00 02A6')
mfspr rD, SPR

☐ Reserved

| 31 | D | spr* | 339 | 0 |
|---|---|---|---|---|
| 0 | 5 6 | 10 11 | 20 21 | 30 31 |

NOTE: *This is a split field.
n ← spr[5-9] || spr[0-4]
rD ← SPR(n)

In the PowerPC UISA, the SPR field denotes a special-purpose register, encoded as shown in Table 8-9. The contents of the designated special purpose register are placed into rD

TABLE 8-9

PowerPC UISA SPR Enodings for mfspr

| | SPR** | | |
|---|---|---|---|
| Decimal | spr[5-9] | spr[0-4] | Register Name |
| 1 | 00000 | 00001 | XER |
| 8 | 00000 | 01000 | LR |
| 9 | 00000 | 01001 | CTR |

**Note:
The order of the two 5-bit halves of the SFR number is reversed compared with the actual instruction coding.

If the SPR field contains any value other than one of the values shown in Table 8-9 (and the processor is in user mode), one of the following occurs:

The system illegal instruction error handler is invoked.
The system supervisor-level instruction error handler is invoked.
The results are boundedly undefined.
Other registers altered:
None
Simplified Mnemonics:
mfxer rD equivalent to mfspr rD,1
mflr rD equivalent to mfspr rD,8
mfctr rD equivalent to mfspr rD,9

Store Doubleword                                            DS-form std     RS,DS(RA)

| 62 | RS | RA | DS | 0 |
|---|---|---|---|---|
| 0 | 6 | 11 | 16 | 30 31 | if RA = 0 then b ← 0
else         b ← (RA)
EA ← b + EXTS (DS || 0b00)
MEM (EA, 8) ← (RS)

Let the effective address (EA) be the sum (RA|0)+ (DS||0b00). (RS) is stored into the doubleword in storage addressed by EA.

Special Registers Altered:
None

Move From Special Purpose Register
XFX-form mfspr         RT, SPR

| 31 | RT | spr | 339 | / |
|---|---|---|---|---|
| 0 | 6 | 11 | 21 | 31 | n ← spr5:9 || spr0:4
if length(SPR(n)) = 64 then
    RT ← SPR(n)
else
    RT ← 32⁰ || SPR(n)

The SPR field denotes a Special Purpose Register, encoded as shown in the table below. The contents of the designated Special Purpose Register are placed into register RT. For Special Purpose Registers that are 32 bits long, the low-order 32 bits of RT receive the contents of the Special Purpose Register and the high-order 32 bits of RT are set to zero.

| | SPR[1] | | Register |
|---|---|---|---|
| decimal | spr5:9 | spr0:4 | Name |
| 1 | 00000 | 00001 | XER |
| 8 | 00000 | 01000 | LR |
| 9 | 00000 | 01001 | CTR |
| 13 | 00000 | 01101 | AMR |
| 136 | 00100 | 01000 | CTRL |
| 256 | 01000 | 00000 | VRSAVE |
| 259 | 01000 | 00011 | SPRG3 |
| 260 | 01000 | 00100 | SPRG4 |
| 261 | 01000 | 00101 | SPRG5 |
| 262 | 01000 | 00110 | SPRG6 |
| 283 | 01000 | 00111 | SPRG7 |
| 268 | 01000 | 01100 | TB |
| 269 | 01000 | 01101 | TBU |
| 512 | 10000 | 00000 | SPEFSCR |
| 526 | 10000 | 01110 | ATB |
| 527 | 10000 | 01111 | ATBU |
| 896 | 11100 | 00000 | PPR |
| 898 | 11100 | 00010 | PPR32 |

[1]Note that the order of the two 5-bit halves of the SPR number is reversed.

Similarly, the instruction sequence
    ld r4, r2, 45 - - -
    mtctr r4
    bcctr where "ld" instruction adds the immediate field value (45) to R2 and uses the result as a main storage address to load an operand from tihe main storage to R4), the "mtctr" instruction copies the value in R4 to a counter, and "bcctr" branches on a count in the counter. This sequence can be optimized as follows ldspr ctr, r2, 45 - - -
    mfctr r4
    bcctr Wherein ldspr is a newly introduced instruction to store SPRs directly to memory. This eliminates the dependence of bcctr on mtctr, and makes it directly dependent on a load operation However, to preserve architecture compliance, mfctr to generate r4 remains a necessary step Load Doubleword                                           DS-form

☒  RT,DS(RA)

| 58 | RT | RA | DS | 0 |
|---|---|---|---|---|
| 0 | 6 | 11 | 16 | 30  31 | if RA = 0 then b ← 0
else            b ← (RA)
EA ← b + EXTS (DS || 0b00)
RT ← MEM (EA, 8)

Let the effective address (EA) be the sum (RA|0)+(DS||0b00). The doubleword in storage addressed by EA is loaded into RT.
Special Registers Altered:
None Move To Special Purpose Register
                                                         XFX-form mtspr      SPR,RS

| 31 | RS | spr | 467 | / |
|---|---|---|---|---|
| 0 | 6 | 11 | 21 | 31 | n ← spr5:9 || spr0:4
if n = 13 then see Book III-S
else
if lenght(SPR(n)) = 64 then
SPR(n) ← (RS)
else
SPR(n) ← (RS)32:63

The SPR field denotes a Special Purpose Register, encoded as shown in the table below. Unless the SPR field contains 13 (denoting the AMR<S>), the contents of register RS are placed into the designated Special Purpose Register. For Special Purpose Registers that are 32 bits long, the low-order 32 bits of RS are placed into the SPR. The AMR (Authority Mask Register) is used for "storage protection" in the Server environment.

| | SPR[1] | | Register |
|---|---|---|---|
| decimal | spr$_{5:9}$ | spr$_{0:4}$ | Name |
| 1 | 00000 | 00001 | XER |
| 8 | 00000 | 01000 | LR |
| 9 | 00000 | 01001 | CTR |
| 13 | 00000 | 01101 | AMR[5] |
| 256 | 01000 | 00000 | VRSAVE |
| 512 | 10000 | 00000 | SPEFSCR[2] |
| 896 | 11100 | 00000 | PPR[3] |
| 898 | 11100 | 00010 | PPR32[4] |

[1]Note that the order of the two 5-bit halves of the SPR number is reversed.
[2]Category: SPE.
[3]Category: Server; see Book III-S.
[4]Category: Phased-In. See Section 3.1 of Book II.
[5]Category: Server: see Book III-S.

If execution of this instruction is attempted specifying an SPR number that is not shown above, or an SPR number that is shown above but is in a category that is not supported by the implementation, one of the following occurs.
If spr0=0, the illegal instruction error handler is invoked.
If spr0=1, the system privileged instruction error handler is invoked.

Branch Conditional to Count Register
                                                          XL-form ☒☒☒☒   BO,BI,BH            (LK = 0)
bcctrl   BO,BI,BH            (LK = 1)

| 19 | BO | BI | /// | BH | 528 | LK |
|---|---|---|---|---|---|---|
| 0 | 6 | 11 | 16 | 19 | 21 | 31 | cond_ok ← BO0 | (CRBI + 32 ≡ BO1)
if cond_ok then NIA ← iea CTR0:61 || 0b00
if LK then LR ← iea CIA + 4

BI+32 specifies the Condition Register bit to be tested. The BO field is used to resolve the branch as described in FIG. 4A2. The BH field is used as described in FIG. 4A4. The branch target address is CTR0:61||0b00, with the high-order 32 bits of the branch target address set to 0 in 32-bit mode. If LK=1 then the effective address of the instruction following the Branch instruction is placed into the Link Register.

If the "decrement and test CTR" option is specified (BO2=0), the instruction form is invalid.

A preferred embodiment equips programmers a way to convey when the last-use of a register value has occurred, and for processor optimization to exploit this information. For example, the instruction set is extended to provide last-use information to the processor in one or more instructions. In an embodiment, an instruction can have a "last-use" indicator for (at least) one of its sources (or targets). In an embodiment, an instruction can have a "next use is last-use" indicator associated with (at least) one of its outputs. Instruction decode optimizes instruction sequences, without preserving intermediate results

FIG A

Previously, dynamic optimization required a sequence of operations received as part of the executing program's instruction stream to be replaced by an improved stream producing the same outputs in order to comply with instruction set architecture. Thus, intermediate results which were computed solely as a function of the instruction set available to the programmer had to be generated to preserve output equivalence. This would have had to occur even if no further use of the intermediate result was present. For example, in a 32 bit architecture, a 16 bit immediate field only provides a 16 bit immediate value. If a 32 bit immediate value is needed, two instructions must be used.

Furthermore, in a computational environment, an instruction set may not offer a 3-way add instruction to compute 3 operands, for example:

a=a+b+c forcing the programmer to use multiple instructions to perform the computation:

temp←b+c a←a+temp which must be executed in order since the intermediate result "temp" is used as a target for the first instruction and a source for the second instruction. Even when executing on a processor supporting 3-way add (denoted herein as ARK3 in its microarchitecture), and when fusing the result, the decode time instruction optimization will need to generate a result corresponding to "temp" in its target location, to ensure the generated optimized sequence is equivalent in its output ARK Rtemp. Rb, Rc
AR Ra, Rtemp
which could be translated to optimized internal instructions that can be executed out of order:
ARK Rtemp. Rb, Rc
ARK3 Ra, Ra, Rb, Rc
Even though temp will not be subsequently used, if the optimizing processor knew that the Rtemp were not to be used again, the following sequence would be a sufficient optimization of the programmer's intent:
ARK3 Ra, Ra, Rb, Rc Aspects of the present invention provide a way for programmers to provide "last-use" information that temp will not be used again, enabling the ARK3 to be generated to replace the two source instructions.

Guiding Optimization Generation

In an embodiment, analysis by the processor for optimized sequence generation may include:
  Indication information, indicating whether optimization can performed
  Which of available optimizations can be performed
  Instruction data from one input instruction that will be needed by a second instruction to generate an optimized sequence, e.g., including, but not limited to register specifiers, immediate constants, instruction address, condition and status information, operation codes corresponding to one or more input instructions, and so forth.

While an embodiment having two decoders providing input to one optimization analysis logic block may be used, other configurations are possible, including, but not limited to:
  One optimization analysis block connected to more than two instruction decoders
  Multiple optimization analysis blocks, each connected to all instruction decoders, or a subset of all instruction decoders
  Multiple optimization analysis blocks interconnected to each other
  Blocks can be implemented as distinct logic functions, or one or more blocks can be combined or subdivided, at the functional, micro-architectural, logic, circuit or physical design level(s).

A determination step for each instruction may be performed to determine:
  Whether semantic effect of instruction has been completely subsumed in its consumer
  The "last-use" indicator is set in the consumer (i.e., in the instruction decoded by decoder 1 in the exemplary figure) of a dependent instruction sequence, or a "next use is last-use" indicator is set in the producer (i.e., in the instruction decoded by decoder 0 in the exemplary figure) of a dependent instruction sequence
  If the determination indicates that both conditions are met, an exemplary instruction generation is suppressed in at least one decoder (e.g., decoder 0 in the exemplary embodiment)

Exemplary Implementation of Optimization Analysis
Analysis Logic Pseudo Code:

```
if (((insn0_is_mflr = '1') AND (insn1_is_std ='1')) AND    /* mflr followed std*/
        (insn0_rt = insn1_rs0))then             /* target of instruction 0 is source of instruction 1 */
    recognized_pattern <= '1';
    pattern <= 0x01;
elsif ((insn0_is_ld = '1') AND (insn1_is_mtlr ='1')) AND /* mflr followed std*/
        (insn0_rt = insn1_rs0)) then            /* target of instruction 0 is source of instruction 1 */
    recognized_pattern <= '1';
    pattern <= 0x02;
elsif (((insn0_is_mfctr = '1') AND (insn1_is_std ='1')) AND /* mflr followed std */
        (insn0_rt = insn1_rs0)) then            /* target of instruction 0 is source of instruction 1 */
    recognized_pattern <= '1';
    pattern <= 0x03;
elsif ((insn0_is_ld = '1') AND (insn1_is_mtlr ='1')) AND    /* mflr followed std */
        (insn0_rt = insn1_rs0)) then            /* target of instruction 0 is source of instruction 1 */
    recognized_pattern <= '1';
    pattern <= 0x04;
elsif ...
else
    recognized_pattern <= '0';
    pattern <= 0x00;
end if
```

In an embodiment, an instruction prefix is employed as opposed to a prefix instruction. An instruction prefix may be thought of as an extension to an instruction, thus an instruction prefix could also be implanted as an instruction suffix. An instruction prefix to an instruction preferably would provide information to the instruction it is prefixing, however, it is also possible to add a prefix to an instruction that provides information to an instruction other than the one it is prefixing. Thus, a prefix instruction is a prefix that is executed in it's own right, having it's own opcode field, wherein an instruction prefix is executed as part of the instruction it is prefixing, and is not an independently executable instruction.

In embodiments of prefixes that indicate a last use of a register in a subsequent instruction, there are two optimization embodiments for handling last-use indication prefixes, that would allow the prefix to be separated from the instruction on which the last use is indicated:

1—in a first embodiment, the prefix is ignored, and the instruction can be executed without prefix, and without the beneficial effects to the register renaming (in an architecture specification where a last-use indication specifies that a future read of a last-use'd architected register returns an undefined value). While this may not be desirable in a high performance execution, it may be acceptable in a lower-performance model (either by choice during design by building a cheaper model that does not have the hardware to handle this prefix, or even by market segmentation, and deliberate disableing of hardware that is present to create a lower and a higher performance model), or when boundary conditions are identified (e.g., an exception happens, or the line buffer runs out of instruction bytes). It may be easier to build a machine that discards the prefix in these circumstances, and if the ISA architecture specifies that reads to last-use'd registers return an undefined value, returning that actual register value is certainly within the bounds of the implementation.

2—In another embodiment, the last-use indication could be captures in a program status word (PSW) or configuration register (CR) and be saved and restored during context switches, and be used to restart after an exception or context switch, and have the prefix applied to the pending instruction after returning from the exception, e.g., with a special return from interrupt instruction.

ADDITIONAL EXAMPLES (Examples where instructions have a "last-use" indicator, provided by the programmer to enable a processor to optimize instructions while not saving intermediate results that will not be used in a future instruction. The last-use indicator may be provided in a variety of ways, for example by an instruction opcode indicating a register value is a last-use, a field of the instruction associated with a register field of a register having a last-use, a prefix instruction indicating a register of a next instruction has a last-use value and the like):

In accordance with the present invention, an exemplary new "stspr" instruction is contemplated for the example PowerPC instruction set architecture (ISA) is as follows:

The instruction sequence
mflr<next use of GPR target is last-use>r4
std r4, r2, 45

(Where mflr is a form of the Move From Special Register instruction based on the SPR bits of the instruction) that moves the LR to RT (r4) In this case the std r4 register has been identified as a last-use of the r4 value. The sequence can be optimized by employing a new 'Store Special Register' instruction (stspr):

stspr lr, r2, 45

Where a new stspr instruction (or iop) adds contents of r2 to the sign extended immediate field (45) to form an effective address (EA) of main storage and stores a special register LR at EA. Since r4 was identified as a last use, there is no need to store a result in r4 in the optimized version.

The instruction sequence:
ld r4, r2, 45
mtctr<last-use of GPR source>r4
bcctr

Can be optimized as follows:
ldspr ctr, r2, 45
bcctr where ldspr is a new instruction (or iop) that loads a value to the CTR special register, the value located at a main storage EA calculated by adding the contents of r2 to the sign extended immediate field value (45). Since r4 was identified as a last use, there is no need to store a result in r4 in the optimized version.

In fixed-length RISC instruction sets, the number of opcodes is limited due to the available encoding space. This has forced architects to limit the number of instructions accepting immediate values as part of their opcode. However, using instruction decode time optimization, many sequences can be optimized. Unfortunately, in several instances, intermediate results must be preserved for architectural correctness. By indicating a last-use, (where the last-use indication indicates that after this operation, the value should be architecturally undefined), microarchitects are afforded the benefit of increased flexibility in capturing computations in operations including immediate constants, and improve the number of instructions executed, and reducing cycles per instruction (CPI).

EXAMPLES

In accordance with the present invention, an exemplary addition to the Power ISA is as follows (combining both types of indicators).

The instruction sequence
li r5, 125
lvx<last-use of r5>v3, r1, r5 where LI is a form of the addis instruction where RA field is 0. The sign extended immediate field value (125) is stored in RT (r5). The LVX instruction calculates the effective address (EA) as the sum (RA)+(RB)((r1)+(r5)), obtains the quadword in storage addressed by the result of EA. ANDs the obtained quadword with 0xFFFF FFFF_FFFF_FFF0 and loads the result into vector RT register (v3).

Can be optimized as follows
lvd v3, r1, 125

Where lvd is a new instruction (or iop) that calculates the effective address (EA) by the sum (RA)+(SIMM) ((r1)+125), obtains the quadword in storage addressed by the result of EA. ANDs the obtained quadword with 0xFFFF_FFFF_FFFF_FFF0 and loads the result into vector RT register (v3). Since r5 was identified as a last-use, there is no need to store a result in r5 of the optimized version.

Figure 4B:
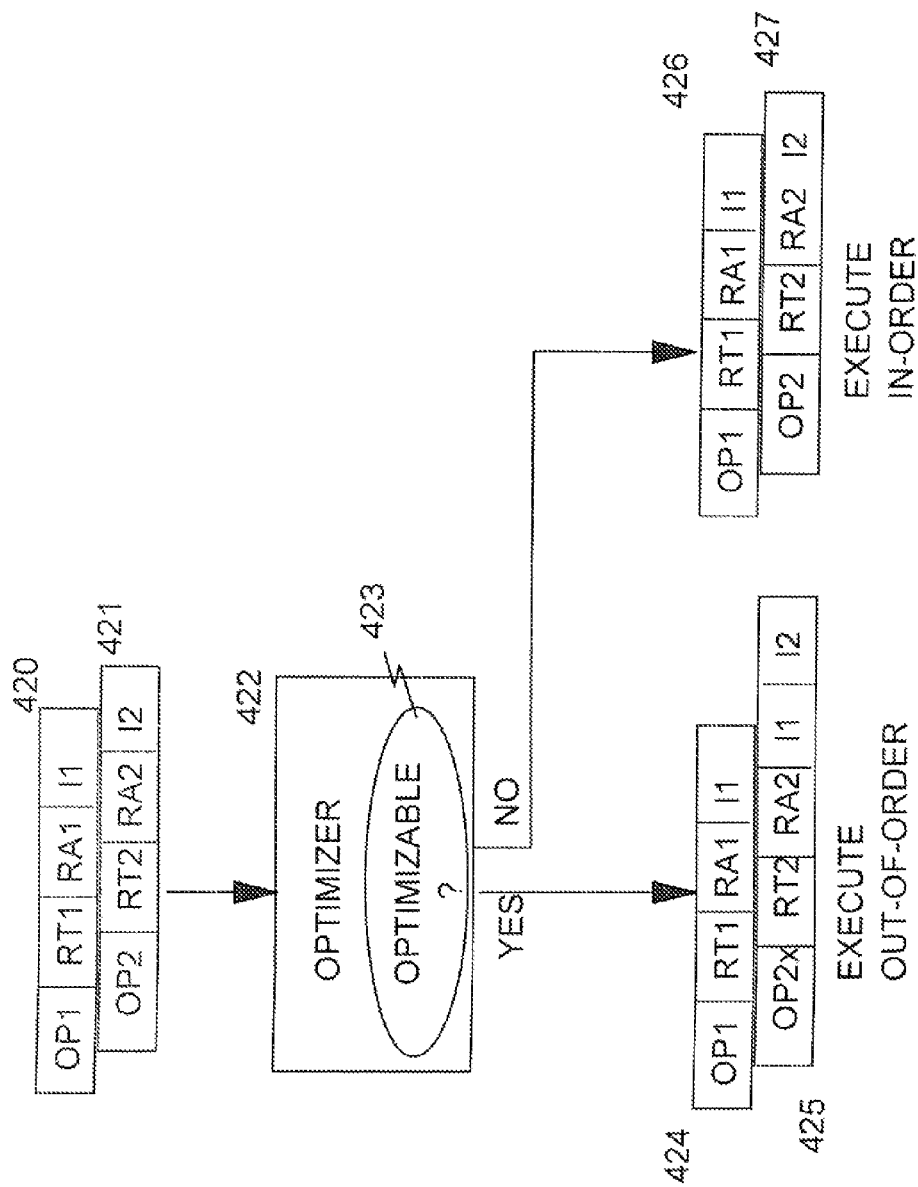
FIGS. 4B-4E depicts example optimization.

Referring to FIG. 4B, an embodiment of an example optimizer 422 is shown. A first instruction 420 and a next sequential instruction (NSI) 421 are determined to be candidates for optimization 423. The first example instruction 420 includes an opcode (OP1) a source register field (RA1), an immediate field (I1) and a result target field (RT1). The NSI example instruction 421 includes an opcode (OP2) a source register field (RA2), an immediate field (I2) and a result target field (RT2). If they are not optimizable according to the optimization criterion, they are executed in order (OP1 426 then OP2 427). If, however, they meet the criterion (including that RT1=RA2), the NSI is modified by the optimizer 422 to include a concatenated value of I1 and I2 to produce a new NSI 425, that can be executed out-of-order relative to the first instruction 424, preferably the modified NSI has a new effective opcode (OP2x).

Figure 4C:
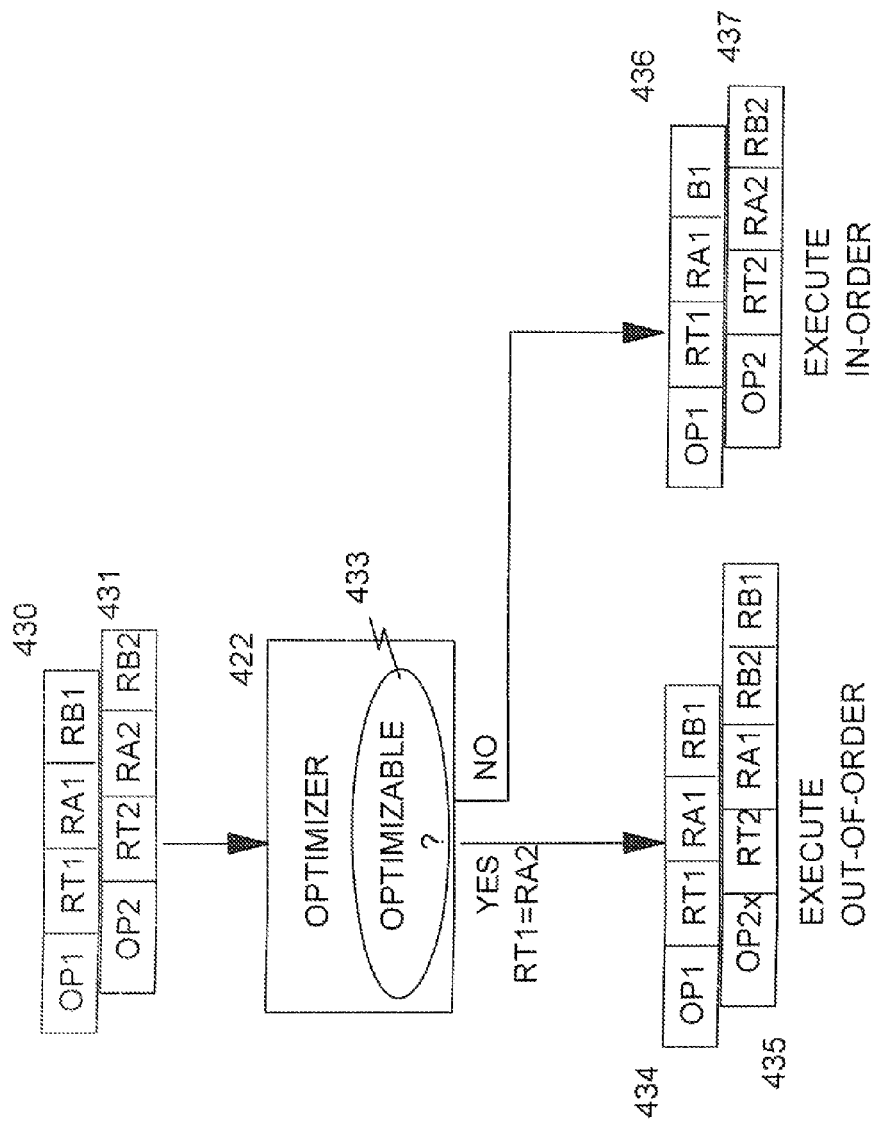

Referring to FIG. 4C, another embodiment of an example optimizer 422 is shown. A first instruction 430 and a next sequential instruction (NSI) 431 are determined to be candidates for optimization 433. The first example instruction 430 includes an opcode (OP1) a source register field (RA1), another source register field (RB1) and a result target field (RT1). The NSI example instruction 431 includes an opcode (OP2) a source register field (RA2), another source register field (RB2) and a result target field (RT2). If they are not optimizable according to the optimization criterion, they are executed in order (OP1 436 then OP2 437). If, however, they meet the criterion (including that RT1=RA2), the NSI is modified by the optimizer 422 to include RB1 to produce a new NSI 435, that can be executed out-of-order relative to the first instruction 434, preferably the modified NSI has a new effective opcode (OP2x).

Figure 4D:
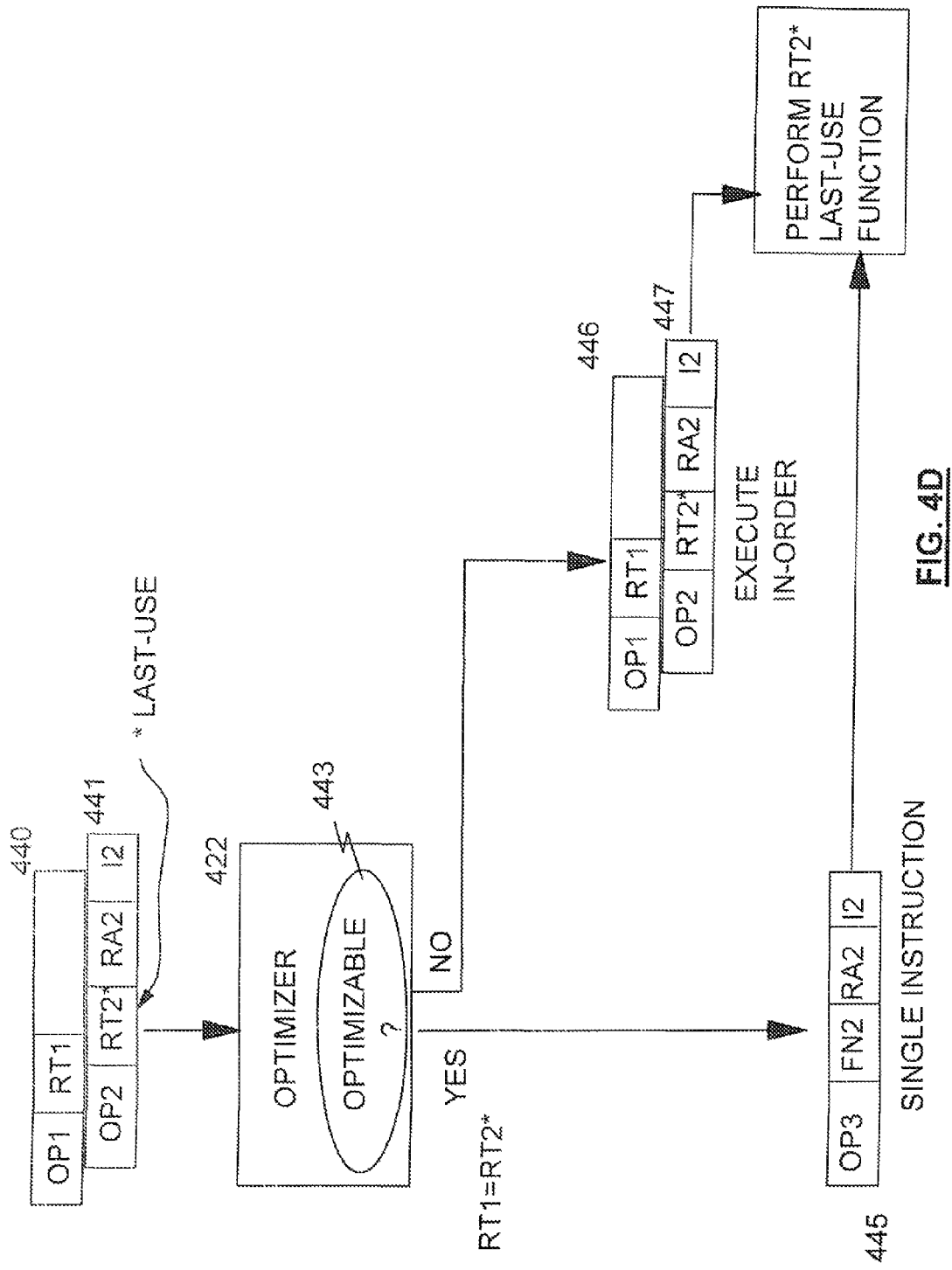

Referring to FIG. 4D, another embodiment of an example optimizer 422 is shown. A first instruction 440 and a next sequential instruction (NSI) 441 are determined to be candidates for optimization 443. The first example instruction 440 includes an opcode (OP1) and a result target field (RT1). The NSI example instruction 441 includes an opcode (OP2) a source register field (RA2), a result target field (RT2) and an immediate field (I2), wherein execution of the NSI 441 adds the operand at RA2 to the immediate field (I2) to create an effective address (EA) of main storage. A last-use indicator is associated with the NSI instruction 441 indicating the result register RT2* operand will not be used again. If the pair of instructions 440 441 are not optimizable according to the optimization criterion, they are executed in order (OP1 446 then OP2 447). If, however, they 440 441 meet the criterion (including that RT1=RT2), the NSI 441 is modified by the optimizer 422 to produce a new NSI 445 having a new opcode (OP3) and a function field (FN2), the FN2 field identifying the special register of the first instruction 440 wherein the new NSI 445 stores the special register identified by the FN2 field at the EA calculate by use of RA2 and I2. Whether the 2 instructions 440 441 are optimizable or not, execution of the new NSI instruction 445 or the original NSI instruction 447 causes a last-use function to be performed on the RT2 architected register.

Figure 4E:
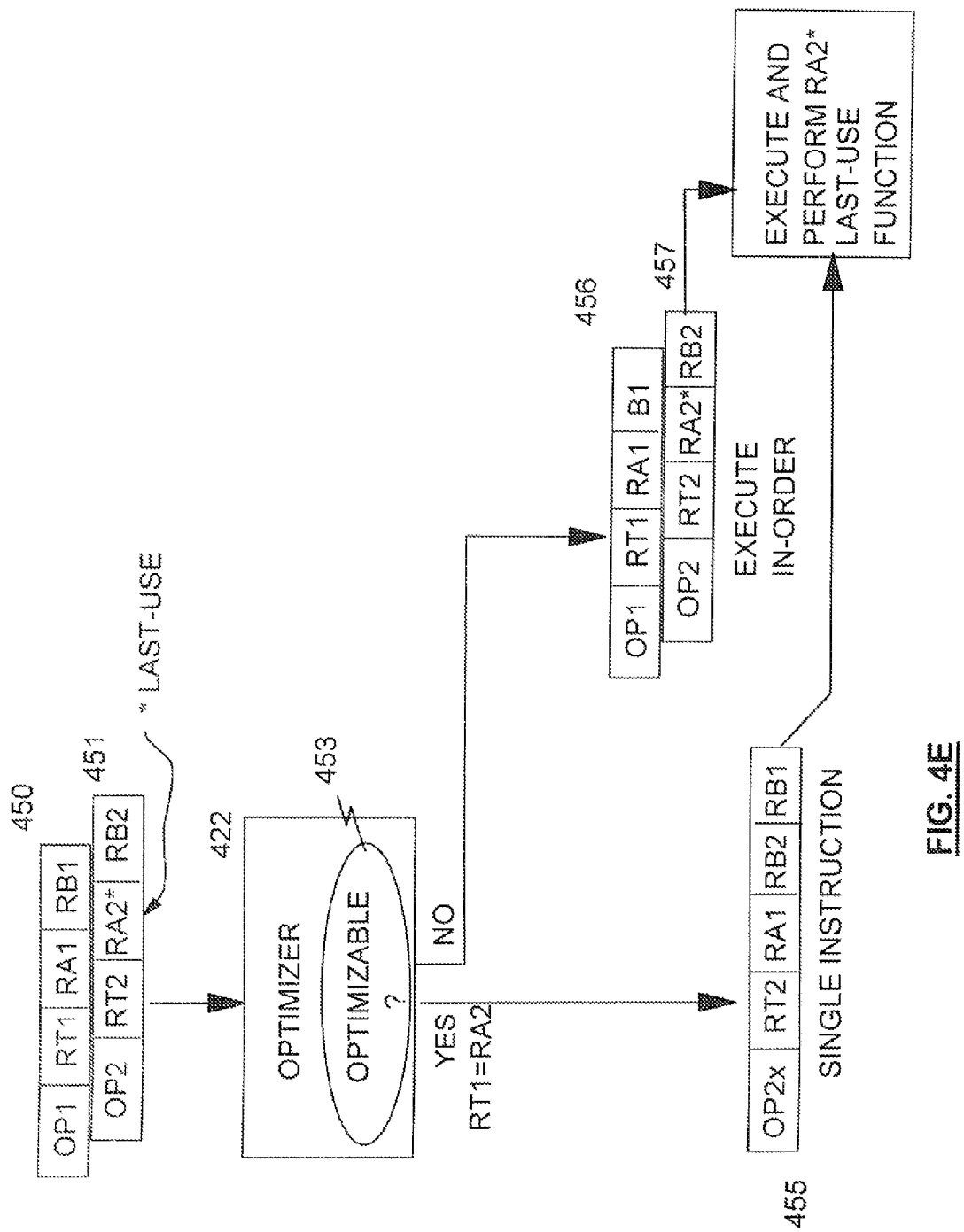

Referring to FIG. 4E, another embodiment of an example optimizer 422 is shown. A first instruction 450 and a next sequential instruction (NSI) 411 are determined to be candidates for optimization 453. The first example instruction 450 includes an opcode (OP1), two source register fields (RA1, RB1) and result target field (RT1). The NSI example instruction 451 includes an opcode (OP2) two source register fields (RA2*, RB2), and a result target field (RT2), wherein execution of the pair of instructions 450 451 performs an operation on 3 operands (RA1, RB1 and RB2) and stores a result in result register (RT2). A last-use indicator is associated with the NSI instruction 451 indicating the source register RA2* operand will not be used again. If the pair of instructions 450 451 are not optimizable according to the optimization criterion, they are executed in order (OP1 456 then OP2 457). If, however, they 440 441 meet the criterion (including that RT1=RA2), the NSI 451 is modified by the optimizer 422 to produce a new NSI 455 having a new opcode (OP2x) and three operands (RA1, RB2 and RB1). Whether the 2 instructions 450 451 are optimizable or not, execution of the new NSI instruction 455 or the original NSI instruction 457 causes a last-use function to be performed on the RA2 architected register.

Figure 5:
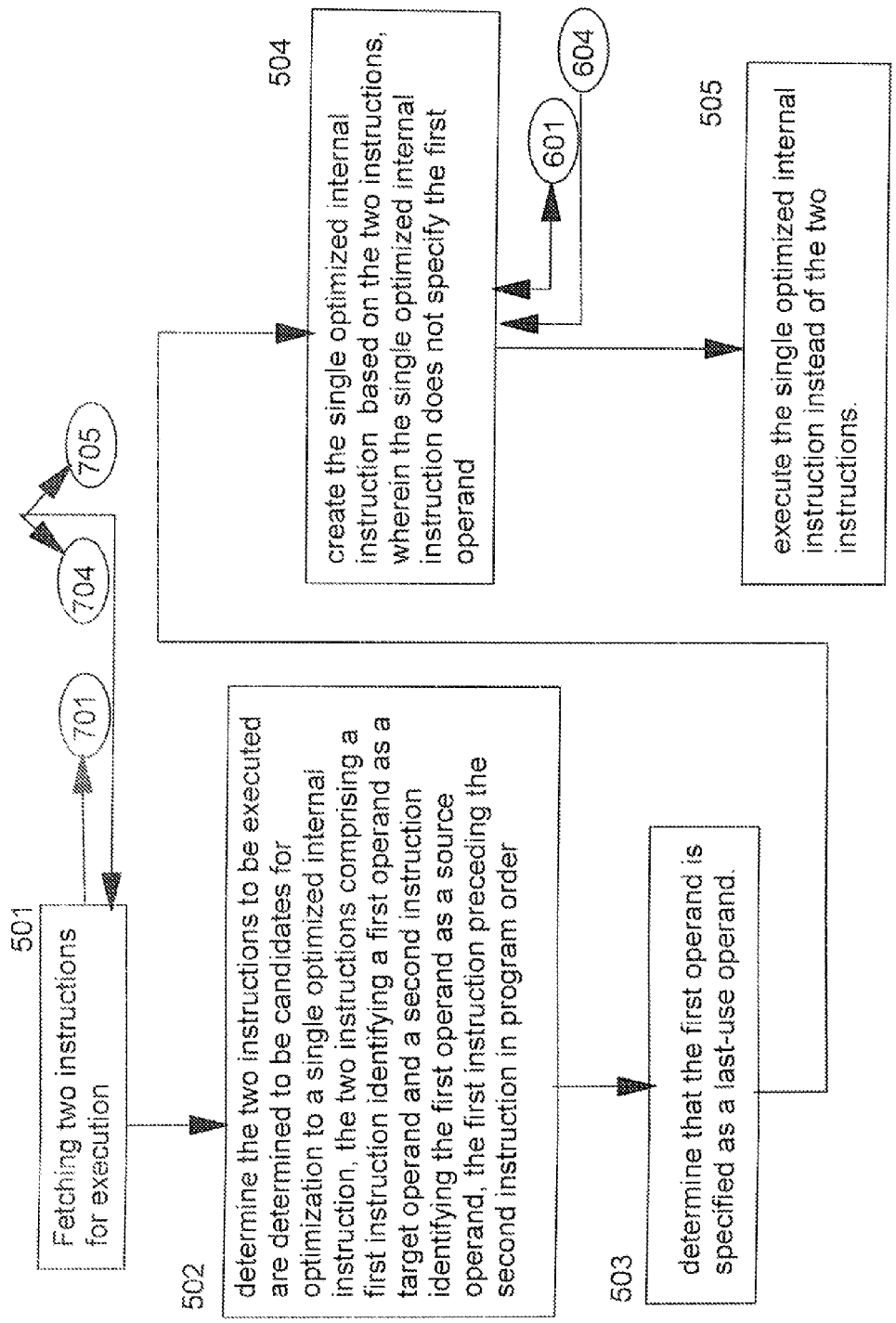
FIG. 5 is an example flowchart depicting aspects of the invention.

Thus, referring to FIG. 5, two instructions are fetched 501 for execution in an embodiment, two instructions to be executed are determined to be candidates for optimization 502 to a single optimized internal instruction, the two instructions comprising a first instruction identifying a first operand as a target operand and a second instruction identifying the first operand as a source operand, the first instruction preceding the second instruction in program order. The first operand is determined to be specified as a last-use operand 503. The single optimized internal instruction is created 504 based on the two instructions, wherein the single optimized internal instruction does not specify the first operand. The single optimized internal instruction is executed 505 instead of the two instructions.

Figure 6:
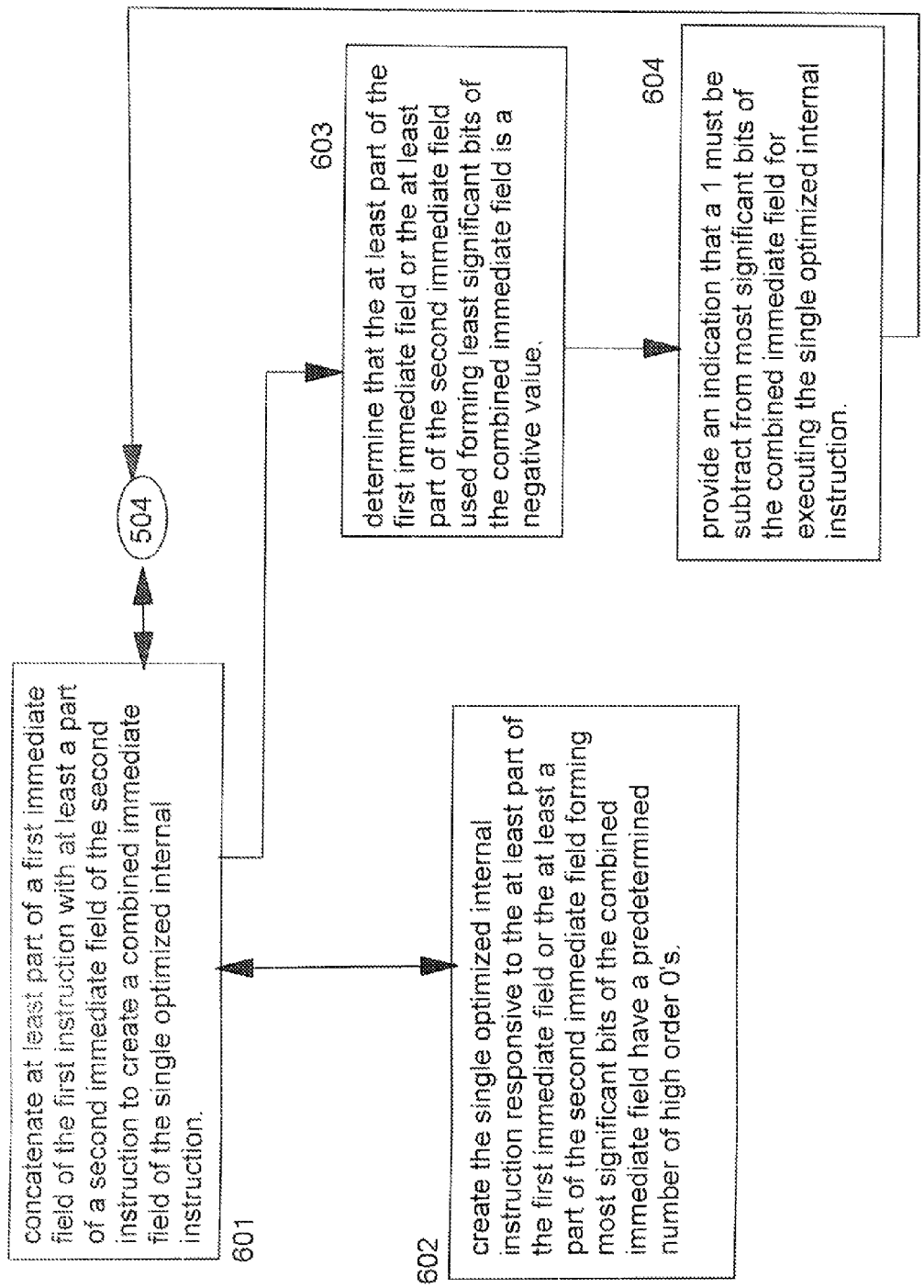
FIG. 6 is an example flowchart depicting aspects of the invention.
Figure 7:
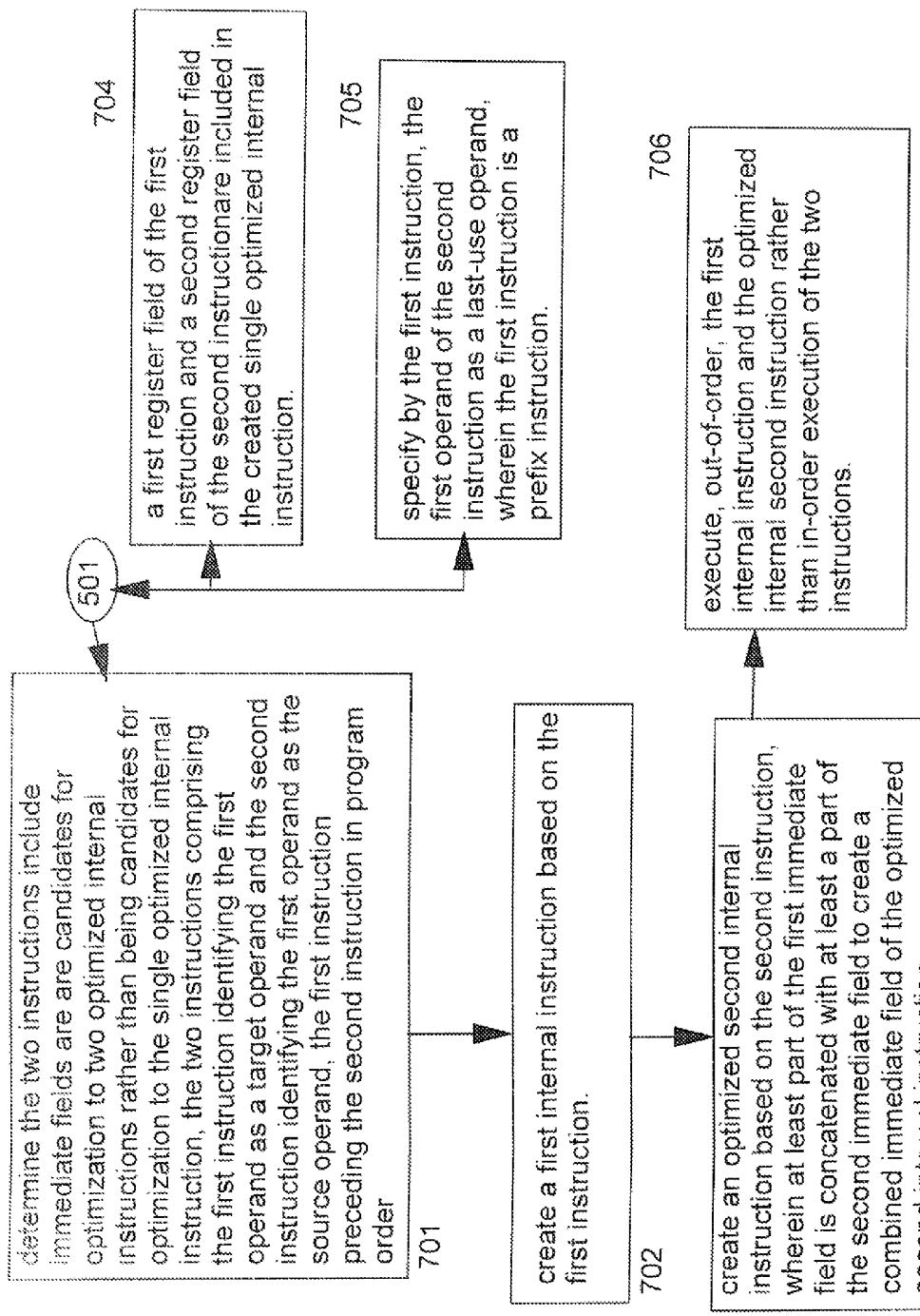
FIG. 7 is an example flowchart depicting aspects of the invention.

Referring to FIG. 6, in an embodiment, the first instruction includes a first immediate field and the second instruction comprises a second immediate field. At least part of the first immediate field is concatenated 601 with at least a part of the second immediate field to create a combined immediate field of the single optimized internal instruction.

In an embodiment, the single optimized internal instruction is created 602 responsive to the at least part of the first immediate field or the at least a part of the second immediate field forming most significant bits of the combined immediate field have a predetermined number of high order 0's.

In an embodiment, it is determined 603 that the at least part of the first immediate field or the at least part of the second immediate field used forming least significant bits of the combined immediate field is a negative value, and an indication is provided 604, preferably to a pipeline, that a 1 must be subtract from most significant bits of the combined immediate field for executing the single optimized internal instruction.

In an embodiment, the first instruction includes a first immediate field and the second instruction comprises a second immediate field. The two instructions to be executed are determined 701 to be candidates for optimization to two optimized internal instructions rather than being candidates for optimization to the single optimized internal instruction, the two instructions comprising the first instruction identifying the first operand as a target operand and the second instruction identifying the first operand as the source operand, the first instruction preceding the second instruction in program order. A first internal instruction is created 702 based on the first instruction. At least part of the first immediate field is concatenated with at least a part of the second immediate field to create 703 a combined immediate field of an optimized second internal instruction wherein out-of-order execution of the first internal instruction and the optimized internal second instruction is permitted 706 rather than in-order execution of the two instructions.

In an embodiment, the first instruction includes 704 a first register field and the second instruction comprises a second register field wherein, the first register field and the second register field are included in the created single optimized internal instruction.

In an embodiment, the first instruction is a prefix instruction for specifying 705 the first operand of the second instruction as a last-use operand.

Preferably, an indication of which architected registers are enabled or not enabled is saved for a program (X) being interrupted, and an indication of which architected registers are enabled or not enabled is obtained from the for new program (Y) is fetched during a context switch to a save area, such as an architected register or a main storage location available to an operating system (OS). The indication may be a bit significant field where each bit corresponds to an architected register entry, or a range, or otherwise indicating the enabled/active architected registers. In an embodiment, only a subset, determined by the OS, may be enabled. In an embodiment each thread of a multi-threaded processor has it's own set of enabled, disabled indicators. In another embodiment, the value of active indicators of an active program or thread can be explicitly set by machine instructions available to the active program or thread.

In an embodiment, an access to a disable architected register causes a program exception to be indicated.

In an embodiment, a disabled architected register is enabled by execution of a register enabling instruction that does not write to the disabled architected register.

In a commercial implementation of functions and instructions, such as operating system programmers writing in assembler language. These instruction formats stored in a storage medium 114 (also known as main storage or main memory) may be executed natively in a z/Architecture IBM Server, PowerPC IBM server, or alternatively, in machines executing other architectures. They can be emulated in the existing and in future IBM servers and on other machines of IBM (e.g. pSeries® Servers and xSeries® Servers). They can be executed in machines where generally execution is in an emulation mode.

In an embodiment, instructions and functions defined for a fist processor designed for an instruction set architecture (ISA) are emulated on a second processor having a different ISA. Machine instructions of a first ISA for example, are translated to emulation program routines employing machine instructions and functions of a second ISA. The emulation program, running on the second processor, runs programs written to the first ISA by fetching machine instructions of the program, translating the fetched machine instructions to program modules comprising machine instructions of the second ISA and then executing the program modules on the second processor designed to the second ISA.

In emulation mode, the specific instruction being emulated is decoded, and a subroutine is built to implement the individual instruction, as in a C subroutine or driver, or some other technique is used for providing a driver for the specific hardware, as is within the skill of those in the art after understanding the description of an embodiment of the invention.

Moreover, the various embodiments described above are just examples. There may be many variations to these embodiments without departing from the spirit of the present invention. For instance, although a logically partitioned environment may be described herein, this is only one example. Aspects of the invention are beneficial to many types of environments, including other environments that have a plurality of zones, and non-partitioned environments. Further, there may be no central processor complexes, but yet, multiple processors coupled together. Yet further, one or more aspects of the invention are applicable to single processor environments.

Although particular environments are described herein, again, many variations to these environments can be implemented without departing from the spirit of the present invention. For example, if the environment is logically partitioned, then more or fewer logical partitions may be included in the environment. Further, there may be multiple central processing complexes coupled together. These are only some of the variations that can be made without departing from the spirit of the present invention. Additionally, other variations are possible. For example, although the controller described herein serializes the instruction so that one IDTE instruction executes at one time, in another embodiment, multiple instructions may execute at one time. Further, the environment may include multiple controllers. Yet further, multiple quiesce requests (from one or more controllers) may be concurrently outstanding in the system. Additional variations are also possible.

As used herein, the term "processing unit" includes pageable entities, such as guests; processors; emulators; and/or other similar components. Moreover, the term "by a processing unit" includes on behalf of a processing unit. The term "buffer" includes an area of storage, as well as different types of data structures, including, but not limited to, arrays: and the term "table" can include other than table type data structures. Further, the instruction can include other than registers to designate information. Moreover, a page, a segment and/or a region can be of sizes different than those described herein.

One or more of the capabilities of the present invention can be implemented in software, firmware, hardware, or some combination thereof. Further, one or more of the capabilities can be emulated.

One or more aspects of the present invention can be included in an article of manufacture (e.g., one or more computer program products) having, for instance, computer usable media. The media has embodied therein, for instance, computer readable program code means or logic (e.g., instructions, code, commands, etc.) to provide and facilitate the capabilities of the present invention. The article of manufacture can be included as a part of a computer system or sold separately. The media (also known as a tangible storage medium) may be implemented on a storage device 120 as fixed or portable media, in read-only-memory (ROM) 116, in random access memory (RAM) 114, or stored on a computer chip of a CPU (110), an I/O adapter 118 for example.

Additionally, at least one program storage device 120 comprising storage media, readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer system for optimizing instructions to be executed, the system comprising:
   a processor, the processor comprising an instruction fetcher, an instruction decoder and an execution unit, the processor configured to perform a method comprising:
   fetching two instructions for execution;
   determining that the two instructions to be executed are candidates for optimization to a single optimized internal instruction, the two instructions comprising a first instruction identifying a first operand as a target operand and a second instruction identifying, the first operand as a source operand, the first instruction preceding the second instruction in program order;
   determining that the first operand is specified as a last-use operand that is not used after execution of the second instruction;
   creating the single optimized internal instruction based on the two instructions, wherein the single optimized internal instruction does not specify the first operand; and
   executing the single optimized internal instruction instead of the two instructions.

2. The system according to claim 1, wherein the first instruction includes a first immediate field and the second instruction comprises a second immediate field, the method further comprising:
   concatenating at least part of the first immediate field with at least part of the second immediate field to create a combined immediate field of the single optimized internal instruction.

3. The system according to claim 2, wherein the single optimized internal instruction is created based on the at least part of the first immediate field or the at least part of the second immediate field forming most significant bits of the combined immediate field having a predetermined number of high order 0's.

4. The system according to claim 2, wherein concatenating further comprises:
   determining that the at least part of the first immediate field or the at least part of the second immediate field used forming least significant bits of the combined in field is a negative value; and
   providing an indication that a 1 must be subtracted from most significant bits of the combined immediate field for executing the single optimized internal instruction.

5. The system according to claim 1, wherein the first instruction includes a first immediate field and the second instruction comprises a second immediate field, the method further comprising:
- determining that the two instructions to be executed are candidates for optimization to two optimized internal instructions rather than being candidates for optimization to the single optimized internal instruction, the two instructions comprising the first instruction identifying the first operand as a target operand and the second instruction identifying the first operand as the source operand, the first instruction preceding the second instruction in program order;
- based on the first instruction, creating a first internal instruction;
- based on the second instruction, concatenating at least part of the first immediate field with at least part of the second immediate field to create a combined immediate field of an optimized second internal instruction; and
- permitting out-of-order execution of the first internal instruction and the optimized internal second instruction rather than in-order execution of the two instructions.

6. The system according to claim 1, wherein the first instruction includes a first register field and the second instruction comprises a second register field, the method further comprising:
- including the first register field and the second register field in the created single optimized internal instruction.

7. The system according to claim 1, wherein the first instruction is a prefix instruction for specifying the first operand of the second instruction as a last-use operand.

8. A computer program product for executing instructions, the computer program product comprising a non-transitory storage medium readable by a processing circuit and storing instructions for execution by the processing circuit for performing a method comprising:
- fetching two instructions for execution:
- determining, by a processor, that the two instructions to be executed are candidates for optimization to a single optimized internal instruction, the two instructions comprising a first instruction identifying a first operand as a target operand and a second instruction identifying the first operand as a source operand, the first instruction preceding the second instruction in program order;
- determining that the first operand is specified as a last-use operand that is not used after execution of the second instruction;
- creating, by the processor, the single optimized internal instruction based on the two instructions, wherein the single optimized internal instruction does not specify the first operand; and
- executing the single optimized internal instruction instead of the two instructions.

9. The computer program product according to claim 8, wherein the first instruction includes a first immediate field and the second instruction comprises a. second. immediate field, the method further comprising:
- concatenating at least part of the first immediate field with at least part of the second immediate field to create a combined immediate field of the single optimized internal instruction.

10. The computer program product according to claim 9, wherein the single optimized internal instruction is created based on the at least part of the first immediate field or the at least part of the second immediate field forming most significant bits of the combined immediate field having a predetermined number of high order 0's.

11. The computer program product according to claim 9, wherein concatenating further comprises:
- determining that the at least part of the first immediate field or the at least part of the second immediate field used forming least significant bits of the combined immediate field is a. negative value; and
- providing an indication that a 1 must be subtracted from most significant bits of the combined immediate field for executing the single optimized internal instruction.

12. The computer program product according to claim 8, wherein the first instruction includes a first immediate field and the second instruction comprises a second immediate field, that method further comprising:
- determining that the two instructions to be executed are candidates for optimization to two optimized internal instructions rather than being candidates for optimization to the single optimized internal instruction, the two instructions comprising the first instruction identifying the first operand as a target operand and the second instruction identifying the first operand as the source operand, the first instruction preceding the second instruction in program order;
- based on the first instruction, creating a first internal instruction;
- based on the second instruction, concatenating at least part of the first immediate field with at least part of the second immediate field to create a combined immediate field of an optimized second internal instruction; and
- permitting out-of-order execution of the first internal instruction and the optimized internal second instruction rather than in-order execution of the two instructions.

13. The computer program product according to claim 8, wherein the first instruction includes a first register field and the second instruction comprises a second register field, the method further comprising:
- including the first register field and the second register field in the created single optimized internal instruction.

14. The computer program product according to claim 8, wherein the first instruction is a prefix instruction for specifying the first operand of the second instruction as a last-use operand.

15. The system according to claim 1. wherein one of the two instructions contains a last-use indicator specifying the first operand as a last-use operand that is not used after execution of the second instruction.

16. The computer program product according to claim 8, wherein one of the two instructions contains a last-use indicator specifying the first operand as a last-use operand that is not used after execution of the second instruction.

* * * * *